(12) United States Patent
Yamamoto et al.

(10) Patent No.: US 10,497,106 B2
(45) Date of Patent: Dec. 3, 2019

(54) IMAGE PROCESSING APPARATUS, IMAGE PROCESSING METHOD, AND COMPUTER-READABLE RECORDING MEDIUM HAVING RECORDED THEREON A PROGRAM FOR PERFORMING THE IMAGE PROCESSING METHOD

(71) Applicant: SAMSUNG ELECTRONICS CO., LTD., Suwon-si (KR)

(72) Inventors: Takahisa Yamamoto, Yokohama (JP); Ryota Kawauchi, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 15/824,487

(22) Filed: Nov. 28, 2017

(65) Prior Publication Data

US 2018/0150948 A1    May 31, 2018

(30) Foreign Application Priority Data

Nov. 28, 2016  (JP) .................................. 2016-230013
Sep. 6, 2017   (JP) .................................. 2017-171392
Nov. 17, 2017  (KR) ......................... 10-2017-0153968

(51) Int. Cl.
*G06T 5/20*    (2006.01)
*G06K 9/62*    (2006.01)
(Continued)

(52) U.S. Cl.
CPC ............. *G06T 5/20* (2013.01); *G06K 9/4661* (2013.01); *G06K 9/6202* (2013.01); *G06T 5/004* (2013.01);
(Continued)

(58) Field of Classification Search
None
See application file for complete search history.

(56) References Cited

U.S. PATENT DOCUMENTS 7,689,035 B2 *  3/2010  Mallick ..................... G06T 5/30
                                                  382/163
8,380,000 B2    2/2013  Lee et al.
(Continued)

FOREIGN PATENT DOCUMENTS

JP    2004-21388 A    1/2004
JP    2007-285869 A   11/2007
(Continued)

OTHER PUBLICATIONS

Shafer, S., "Using Color to Separate Reflection Components", 1984, 31 pages total.

(Continued)

*Primary Examiner* — Leon Viet Q Nguyen
(74) *Attorney, Agent, or Firm* — Sughrue Mion, PLLC

(57) ABSTRACT

Provided is an image processing apparatus that includes a component obtainer configured to obtain diffusive reflection components and specular reflection components for pixels of an input image, a filter processor configured to perform filter-processing on a diffusive reflection component image, a specular reflection component image, and the input image, a component combiner configured to combine the filter-processed diffusive reflection component image and the filter-processed specular reflection component image to generate a combined image, and an evaluator configured to evaluate a separation accuracy of the diffusive reflection components or the specular reflection components based on the combined image and the filter-processed input image.

20 Claims, 15 Drawing Sheets
(7 of 15 Drawing Sheet(s) Filed in Color)

(51) Int. Cl.
*G06T 11/60* (2006.01)
*G06T 5/00* (2006.01)
*G06T 5/50* (2006.01)
*G06K 9/46* (2006.01)

(52) U.S. Cl.
CPC ............... *G06T 5/50* (2013.01); *G06T 11/60* (2013.01); *G06T 2207/20224* (2013.01)

(56) References Cited

U.S. PATENT DOCUMENTS

| | | | |
|---|---|---|---|
| 8,457,389 B2* | 6/2013 | Ishiyama | G06K 9/00241 345/419 |
| 8,488,879 B2 | 7/2013 | Kobiki et al. | |
| 8,823,876 B2* | 9/2014 | Fukuda | G06T 5/002 348/571 |
| 9,087,388 B2 | 7/2015 | Iwasaki et al. | |
| 9,111,377 B2 | 8/2015 | Watanabe et al. | |
| 9,235,751 B2 | 1/2016 | Sukegawa et al. | |
| 2006/0018539 A1* | 1/2006 | Sato | G06K 9/36 382/173 |
| 2007/0065015 A1* | 3/2007 | Nishiyama | G06K 9/00208 382/190 |
| 2007/0188613 A1* | 8/2007 | Nobori | G06T 11/60 348/207.1 |
| 2008/0107333 A1* | 5/2008 | Mazinani | G06T 5/20 382/167 |
| 2013/0251288 A1* | 9/2013 | Kobiki | G06T 5/003 382/298 |
| 2014/0301637 A1 | 10/2014 | Jin et al. | |

FOREIGN PATENT DOCUMENTS

| | | |
|---|---|---|
| JP | 2011-522316 A | 7/2011 |
| JP | 2013-65215 A | 4/2013 |
| JP | 2013-196034 A | 9/2013 |
| JP | 2013-196651 A | 9/2013 |
| JP | 2014-74969 A | 4/2014 |

OTHER PUBLICATIONS

Mallick, et al., "Specularity Removal in Images and Videos: A PDE Approach", 2006, 14 pages total.

Mallick, et al., "Dichromatic Separation: Specularity Removal and Editing", 2006, one page total.

Tan, et al., "Separating Reflection Components of Textured Surfaces Using a Single Image" 2005, IEEE Transactions on Pattern Analysis and Machine Intelligence, vol. 27, issue No. 2, pp. 178-193.

Yang, et al., "Real-time Specular Highlight Removal Using Bilateral Filtering*" 2010, 14 pages total.

Akashi, et al., "Separation of reflection components by sparse non-negative matrix factorization", 2016, Computer Vision and Image Understanding, vol. 146, pp. 77-85.

Shen, et al., "Chromaticity-based separation of reflection components in a single image", 2008, Pattern Recognition, vol. 41, pp. 2461-2469.

Nguyen, et al., "Separation of specular and diffuse components using tensor voting in color images", 2014, Applied Optics, vol. 53, Issue No. 33, pp. 7924-7936.

Kobiki, et al., "Separation of specular reflection on consideration of noise for gloss control image", 2012, ITE Annual Convention, 2 pages total.

Hasegawa, M., "New Video Processing Methods to Improve Apparent Gloss" 2012, IEEE International Conference on Consumer Electronics, pp. 632-635.

Anonymous, "Canon develops material appearance image-processing technology that digitizes material appearance information qualities such as gloss and three-dimensional surface characteristics to enable printing reproduction", 2015, Canon Inc., 3 pages total.

Kobiki, et al., "Specular Reflection Control Technology to Increase Glossiness of Images" 2013, pp. 38-41.

Artusi, et al., "A Survey of Specularity Removal Methods", 2011, Computer Graphics Forum vol. 30, Issue No. 8, pp. 2208-2230.

Woodham, R., "Photometric method for determining surface orientation from multiple images" 1980, Optical Engineering, vol. 19, Issue No. 1, pp. 139-144.

Schulüns, et al., "Global and Local Highlight Analysis in Color Images", 2000, 5 pages total.

Nayar, et al., "Separation of Reflection Components Using Color and Polarization", 1997, International Journal of Computer Vision, vol. 21, Issue No. 3, pp. 163-186.

Communication dated Jul. 16, 2019, issued by the European Patent Office in counterpart European Application No. 17874192.2.

Jinli Suo et al., "Fast and High Quality Highlight Removal From a Single Image", IEEE Transactions on Image Processing, vol. 25, No. 11, Nov. 1, 2016, (pp. 5441-5454) XP011624278.

* cited by examiner

FIG. 12

$$\begin{pmatrix} \begin{array}{|c|c|c|} \hline 0 & 0 & 0 \\ \hline 0 & 1 & 0 \\ \hline 0 & 0 & 0 \\ \hline \end{array} \end{pmatrix} + \left( \begin{array}{|c|c|c|} \hline 0 & 0 & 0 \\ \hline 0 & 1 & 0 \\ \hline 0 & 0 & 0 \\ \hline \end{array} - \begin{array}{|c|c|c|} \hline 1/9 & 1/9 & 1/9 \\ \hline 1/9 & 1/9 & 1/9 \\ \hline 1/9 & 1/9 & 1/9 \\ \hline \end{array} \right) \times k = \begin{array}{|c|c|c|} \hline -k/9 & -k/9 & -k/9 \\ \hline -k/9 & 1+8k/9 & -k/9 \\ \hline -k/9 & -k/9 & -k/9 \\ \hline \end{array}$$

1210       1210       1220              1230

1910      1920      1930

IMAGE PROCESSING APPARATUS, IMAGE PROCESSING METHOD, AND COMPUTER-READABLE RECORDING MEDIUM HAVING RECORDED THEREON A PROGRAM FOR PERFORMING THE IMAGE PROCESSING METHOD

CROSS-REFERENCE TO RELATED APPLICATIONS

This application claims priorities from Japanese Patent Application Nos. 2016-230013 and 2017-171392, filed on Nov. 28, 2016 and Sep. 6, 2017, respectively, in the Japan Patent Office, and Korean Patent Application No. 10-2017-0153968, filed on Nov. 17, 2017, in the Korean Patent Office, the disclosures of which are incorporated herein in their entireties by reference.

BACKGROUND

1. Field

Apparatuses and methods consistent with exemplary embodiments relate to an image processing apparatus, an image processing method, and a computer-readable recording medium having recorded thereon a program for performing the image processing method.

2. Description of the Related Art

In image measurement using shades or colors for three-dimensional (3D) shape reconstruction, absence of a specular reflection component in an image may be a precondition. In this case, to perform high-precision measurement, a diffusive reflection component and the specular reflection component need to be accurately separated to remove the specular reflection component.

In image recognition, the specular reflection component shows characteristics of a material, and thus may be detected for use in the recognition.

In image processing, to enhance a glossy feature, a range of the specular reflection component to be controlled needs to be extracted from an input image.

To separate the diffusive reflection component and the specular reflection component, the following two methods are generally used.

One of the methods is to separate the diffusive reflection component and the specular reflection component from a plurality of images, for example, by using photometric stereo or a polarization filter. However, in this method, the plurality of images have to be captured, and the method is not applicable to quality improvement of a device such as a display, etc.

The other method is to separate the diffusive reflection component and the specular reflection component from a single image, for example, by using a model of noise-caused color change or based on an assumption that a color of an object changes smoothly on a surface of the object. For example, Japanese Patent Publication Gazette No. 2013-065215 discloses a method for obtaining a diffusive reflection component of a target pixel without being influenced by noise of an image, in which noise-caused color change is modeled based on an assumption that a color of reflected light is the same on the same surface of the object, and separation accuracy of a diffusive reflection component is expected to be improved by using a noise model.

However, the method for separating the diffusive reflection component and the specular reflection component from the single image may fail in a dichromatic boundary such as a boundary of an object or in a pixel value having a chroma of 0, and has a lower separation accuracy than the method for separating the diffusive reflection component and the specular reflection component from the plurality of images. For example, in the method disclosed in the Japanese Patent Publication Gazette No. 2013-065215, a separation accuracy becomes low for noise that does not match a noise model.

Moreover, when image processing such as filter-processing, etc., is performed on the diffusive reflection component and the specular reflection component separated with the low separation accuracy to obtain a visual effect, image quality may be degraded due to artifacts.

SUMMARY

One or more exemplary embodiments provide an image processing apparatus, an image processing method, and an image processing program in which a diffusive reflection component or a specular reflection component may be obtained from a single input image with high accuracy.

Additional aspects will be set forth in part in the description which follows and, in part, will be apparent from the description, or may be learned by practice of the exemplary embodiments.

According to an aspect of an exemplary embodiment, there is provided an image processing apparatus including: a component obtainer configured to obtain diffusive reflection components and specular reflection components for pixels of an input image; a filter processor configured to perform filter-processing on a diffusive reflection component image based on the obtained diffusive reflection components, a specular reflection component image based on the obtained specular reflection components, and the input image; a component combiner configured to combine the filter-processed diffusive reflection component image and the filter-processed specular reflection component image to generate a combined image; and an evaluator configured to evaluate a separation accuracy of the diffusive reflection components and the specular reflection components based on the combined image and the filter-processed input image, and configured to determine whether to modify at least one of a diffusive reflection component and a specular reflection component of at least one pixel based on a result of evaluation of the separation accuracy.

The evaluator may obtain pixel value differences between the combined image and the filter-processed input image and compare the pixel value differences with a predetermined threshold to evaluate the separation accuracy.

The evaluator may determine to modify the diffusive reflection component or the specular reflection component of a first pixel having a pixel value difference greater than the predetermined threshold, and the image processing apparatus may further include: a modification value obtainer configured to obtain a modification value of the diffusive reflection component or the specular reflection component for the first pixel; and a component modifier configured to modify the diffusive reflection component or the specular reflection component for the first pixel by using the modification value.

The evaluator may evaluate the separation accuracy according to whether a pixel of the filter-processed diffusive reflection component image or the filter-processed specular reflection component image has a negative pixel value.

The evaluator may determine to modify the diffusive reflection component or the specular reflection component of the pixel having the negative pixel value in the filter-processed diffusive reflection component image or the filter-processed specular reflection component image, and the image processing apparatus may further include: a modification value obtainer configured to obtain a modification value of the diffusive reflection component or the specular reflection component for a second pixel; and a component modifier configured to modify the diffusive reflection component or the specular reflection component for the second pixel by using the modification value.

The modification value obtainer may obtain the modification value based on a diffusive reflection component or a specular reflection component of a neighboring pixel that satisfies a predetermined condition, among neighboring pixels around the first pixel.

The predetermined condition may be that a sum of a product of a predetermined first coefficient and a difference between a pixel value of the first pixel in the input image and a pixel value of the neighboring pixel in the input image and a product of a predetermined second coefficient and a difference between a pixel value of the neighboring pixel in the input image and a pixel value of the neighboring pixel in the combined image is smallest.

The image processing apparatus may further include a repetition determiner configured to repeat processing by the component obtainer, in response to determining at least one of a number of first pixels that need modification being greater than or equal to a predetermined first value and a number of performing modification being less than or equal to a predetermined second value.

The evaluator may obtain a peak signal-to-noise ratio (PSNR) between the combined image and the filter-processed input image, and to compare the PSNR with a predetermined threshold to evaluate the separation accuracy.

The image processing apparatus may further include a repetition determiner configured to, in response to the PSNR being less than the predetermined threshold, change a filter strength used in the filter processor, wherein the evaluator is further configured to evaluate the separation accuracy based on a new PSNR that is obtained based on the changed filter strength.

The filter processor may use a high-pass emphasis filter to perform the filter-processing.

The image processing apparatus may further include an analyzer configured to obtain frequency characteristics of the input image, and frequency characteristics of the diffusive reflection component image or the specular reflection component image; and a second evaluator configured to evaluate the separation accuracy based on the frequency characteristics of the input image, and the frequency characteristics of the diffusive reflection component image or the specular reflection component image.

The filter processor may map the frequency characteristics of the diffusive reflection component image or the specular reflection component image to a filter strength used in the filter processor and store a result of mapping, and determine the filter strength for the filter processor based on the frequency characteristics of the diffusive reflection component image or the specular reflection component image.

The component obtainer may obtain a new diffusive reflection component or a new specular reflection component based on the input image, and the modified specular reflection component or the modified diffusive reflection component, and the evaluator may determine whether to modify the new diffusive reflection component or the new specular reflection component based on the pixel value differences between the combined image, which is generated based on the modified specular reflection component or the modified diffusive reflection component, and the filter-processed input image, which is generated based on the modified specular reflection component or the modified diffusive reflection component.

According to an aspect of another exemplary embodiment, there is provided an image processing method including: obtaining diffusive reflection components and specular reflection components of an input image; performing filter-processing on a diffusive reflection component image based on the obtained diffusive reflection components, a specular reflection component image based on the obtained specular reflection components, and the input image; combining the filter-processed diffusive reflection component image and the filter-processed specular reflection component image to generate a combined image; evaluating a separation accuracy of the diffusive reflection components and the specular reflection components based on the combined image and the filter-processed input image; and determining whether to modify at least one of a diffusive reflection component and a specular reflection component of at least pixel based on a result of evaluation of the separation accuracy.

The evaluating may include obtaining pixel value differences between the combined image and the filter-processed input image and comparing the pixel value differences with a predetermined threshold to evaluate the separation accuracy.

The image processing method may further include determining whether to modify the diffusive reflection component or the specular reflection component of a first pixel having a pixel value difference greater than the predetermined threshold; obtaining a modification value of the diffusive reflection component or the specular reflection component for the first pixel; and modifying the diffusive reflection component or the specular reflection component for the first pixel by using the modification value.

According to an aspect of still another exemplary embodiment, there is provided a non-transitory computer-readable recording medium having recorded thereon a program for executing an image processing method, the image processing method including: obtaining diffusive reflection components and specular reflection components for pixels of an input image; performing filter-processing on a diffusive reflection component image, a specular reflection component image, and the input image; combining the filter-processed diffusive reflection component image and the filter-processed specular reflection component image to generate a combined image; evaluating a separation accuracy of the diffusive reflection components and the specular reflection components based on the combined image and the filter-processed input image; and determining whether to modify at least one of a diffusive reflection component and a specular reflection component of at least one pixel based on a result of evaluation of the separation accuracy.

The evaluating may include obtaining pixel value differences between the combined image and the filter-processed input image and comparing the pixel value differences with a predetermined threshold to evaluate the separation accuracy.

The image processing method may further include determining whether to modify the diffusive reflection component or the specular reflection component of a first pixel having a pixel value difference greater than or equal to the predetermined threshold; obtaining a modification value of the diffusive reflection component or the specular reflection component for the first pixel; and modifying the diffusive reflection component or the specular reflection component for the first pixel by using the modification value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the exemplary embodiments, taken in conjunction with the accompanying drawings in which:

FIG. 12 is a diagram for describing a filter according to another exemplary embodiment;

DETAILED DESCRIPTION

Figure 1:
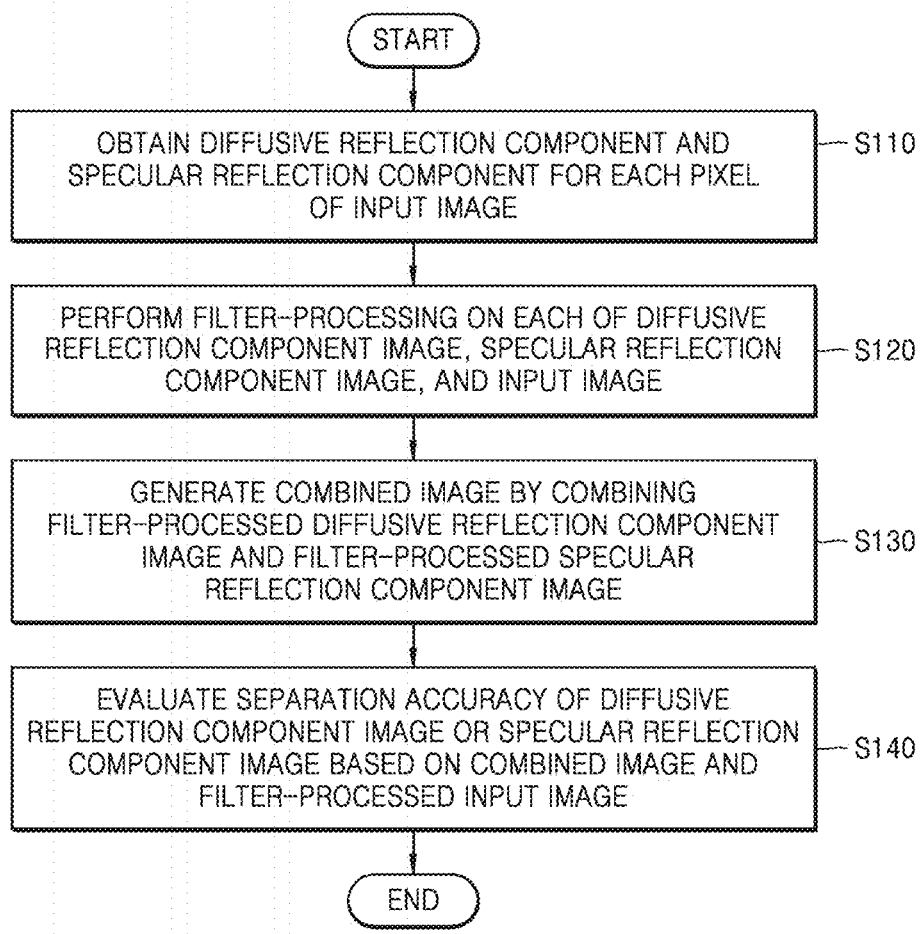
FIG. 1 is a flowchart showing operations of an image processing method according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

An image processing apparatus and an image processing method according to an exemplary embodiment obtain a diffusive reflection component and a specular reflection component from a single image, evaluate separation accuracy of the diffusive reflection component and the specular reflection component pixel by pixel by performing filter-processing on the diffusive reflection component and the specular reflection component, and modify the diffusive reflection component having a low separation accuracy by using a modification value obtained using an independently defined energy function, etc., thereby improving a separation accuracy of the diffusive reflection component and the specular reflection component pixel by pixel.

FIG. 1 is a flowchart showing operations of an image processing method according to an exemplary embodiment.

Referring to FIG. 1, in operation S110, an image processing apparatus obtains a diffusive reflection component and a specular reflection component for each pixel of an input image.

In operation S120, the image processing apparatus performs filter-processing on a diffusive reflection component image including the obtained diffusive reflection component, a specular reflection component image including the obtained specular reflection component, and the input image.

In operation S130, the image processing apparatus combines the filter-processed diffusive reflection component image and the filter-processed specular reflection component image to generate a combined image.

In operation S140, the image processing apparatus evaluates a separation accuracy of the diffusive reflection component and/or the specular reflection component based on the combined image and the filter-processed input image.

Hereinafter, a structure of the image processing apparatus according to an exemplary embodiment will be described.

Figure 2:
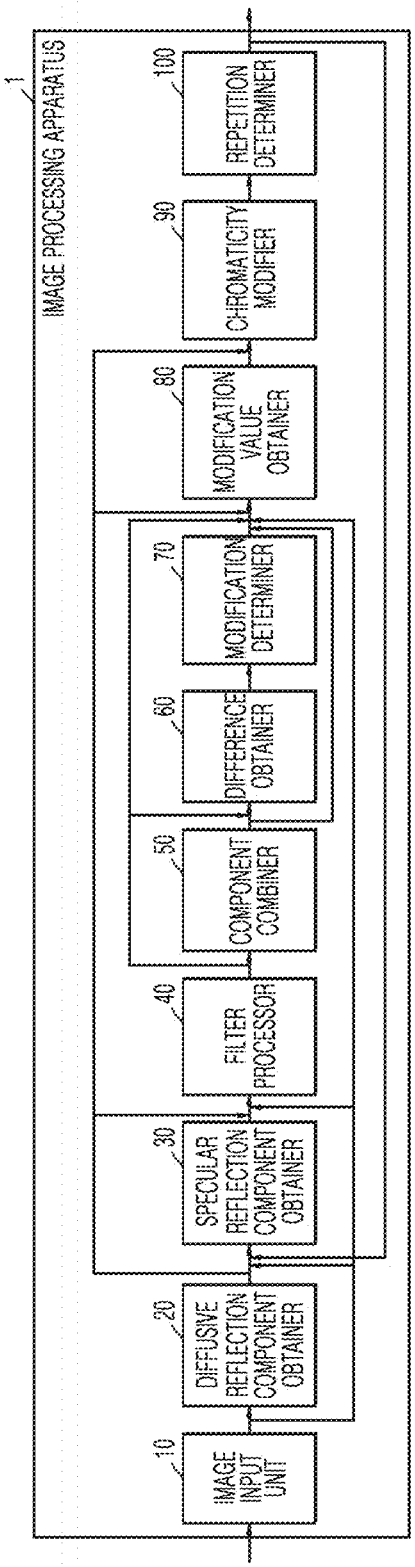
FIG. 2 is a block diagram of an image processing apparatus according to an exemplary embodiment.

FIG. 2 is a block diagram of an image processing apparatus 1 according to an exemplary embodiment.

The image processing apparatus 1 may include an image input unit 10, a diffusive reflection component obtainer 20, a specular reflection component obtainer 30, a filter processor 40, a component combiner 50, a difference obtainer 60, a modification determiner 70, a modification value obtainer 80, a component modifier (or chromaticity modifier) 90, and a repetition determiner 100. The diffusive reflection component obtainer 20 and the specular reflection component obtainer 30 may be combined into one component (e.g., a component obtainer), and the difference obtainer 60 and the modification determiner 70 may be combined into one component (e.g., an evaluator).

The image input unit 10 may receive an image from the outside of the image processing apparatus 1, and outputs the input image to the diffusive reflection component obtainer 20, the specular reflection component obtainer 30, the filter processor 40, and the modification value obtainer 80.

The diffusion reflection component obtainer 20 obtains the diffusive reflection component from the single input image for each pixel, and outputs the obtained diffusive reflection component to the specular reflection component obtainer 30, the filter processor 40, the modification value obtainer 80, and the component modifier 90.

The specular reflection component obtainer 30 obtains the specular reflection component from the input image for each pixel by using, for example, a dichromatic reflection model of Shafer, and outputs the obtained specular reflection component to the filter processor 40. The process of obtaining the specular reflection component using the dichromatic reflection model will be described later.

The filter processor 40 performs filter-processing on the input image, the diffusive reflection component image including the diffusive reflection component, and the specular reflection component image including the specular reflection component, by using a high-pass emphasis filter such as unsharp masking, etc., or a high-pass filter, and outputs a filter-processing result to the component combiner 50, the difference obtainer 60, and the modification value obtainer 80.

The component combiner 50 generates a combined image by combining the filter-processed diffusive reflection component image and the filter-processed specular reflection component image by using the dichromatic reflection model, and outputs the combined image to the difference obtainer 60 and the modification value obtainer 80.

The difference obtainer 60 obtains, pixel by pixel, a pixel value difference between the filter-processed input image and the generated combined image, and outputs the obtained pixel value difference to the modification determiner 70.

The modification determiner 70 compares, pixel by pixel, the pixel value difference with a predetermined threshold value, determines to modify a diffusive reflection component of a pixel having a pixel value difference greater than the threshold value and not to modify a diffusive reflection component of a pixel having a pixel value difference less than or equal to the threshold value, and outputs a result of the determination to the modification value obtainer 80. Herein, the pixel having the pixel value difference greater than the threshold value is a pixel having low separation accuracy of the diffusive reflection component and the specular reflection component.

The modification value obtainer 80 obtains a modification value of the diffusive reflection component for the pixel for which the diffusive reflection component is determined to be modified, and outputs the obtained modification value to the component modifier 90. A method of obtaining a correction value of a diffusive reflection component will be described later.

The component modifier 90 replaces the diffusive reflection value with the modification value for the pixel for which the diffusive reflection component is determined to be modified, and outputs the diffusive reflection value to the repetition determiner 100.

The repetition determiner 100 determines whether a modification level of the diffusive reflection component of the image satisfies a predetermined condition. For example, the repetition determiner 100 determines whether the modification level is such that the number of pixels having low separation accuracy of diffusive reflection components is less than or equal to a predetermined value, or such that the number of modifications of the diffusive reflection components is greater than or equal to a predetermined value.

In response to determining that the modification level of the diffusive reflection component of the image does not satisfy the predetermined condition, the repetition determiner 100 again obtains the specular reflection component (or new specular reflection component) by using a modification result of the component modifier 90 that is provided as an input to the specular reflection component obtainer 30. In response to determining that the modification level of the diffusive reflection component of the image satisfies the predetermined condition, the repetition determiner 100 outputs the diffusive reflection component and specular reflection component obtained or modified for each pixel to the outside of the image processing apparatus 1.

In the image processing apparatus 1 according to an exemplary embodiment, one or more components among those described in FIG. 2 such as the image input unit 10, the diffusive reflection component obtainer 20, etc., may be implemented by executing a program under control of an operation device (not shown) such as a processor included in the image processing apparatus 1, for example, a computer. For example, the processor included in the image processing apparatus 1 may include a central processing unit (CPU).

More specifically, the image processing apparatus 1 loads a program stored in a memory unit (not shown) to a main memory device (not shown) and executes a program under control of an operation device such as a processor, etc. Each component may also be implemented by a combination of some of hardware, firmware, and software, without being limited to software based on a program.

The image processing apparatus 1 may be used in an image display apparatus such as a television (TV), a smartphone, a tablet personal computer (PC), a wearable camera, a high mounted display (HMD), an automobile display, etc.

The program is stored using various types of recording media, e.g., a non-transitory computer-readable medium, and is provided to the image processing apparatus 1. The non-transitory computer-readable medium includes various types of tangible storage media.

Examples of the non-transitory computer-readable medium may include a magnetic recording medium (e.g., a flexible disk, a magnetic tape, a hard disk drive), an opto-magnetic recording medium (e.g., an optical magnetic disk), a compact disc (CD)-read only memory (ROM), CD-read (CD-R), CD-R/write (W), and a semiconductor memory (e.g., a mask ROM, a programmable ROM (PROM), an erasable PROM (EPROM)), a flash ROM, and a random-access memory (RAM)).

The program may also be provided to the image processing apparatus 1 by various types of transitory computer-readable media. Examples of the transitory computer-readable media may include an electric signal, an optical signal, and electromagnetic waves. The transitory computer-readable media may provide a program to the image processing apparatus 1 through a wired communication path such as an electric wire, an optical fiber, etc., or a wireless communication path.

The image processing apparatus and method according to example embodiments may be provided as a computer program product. The computer program product may be transacted as a product between sellers and purchasers. The computer program product comprises software program and storage media storing the software program.

Hereinafter, operations according to the image processing apparatus 1 and the image processing method according to an exemplary embodiment will be described in more detail.

Figure 3:
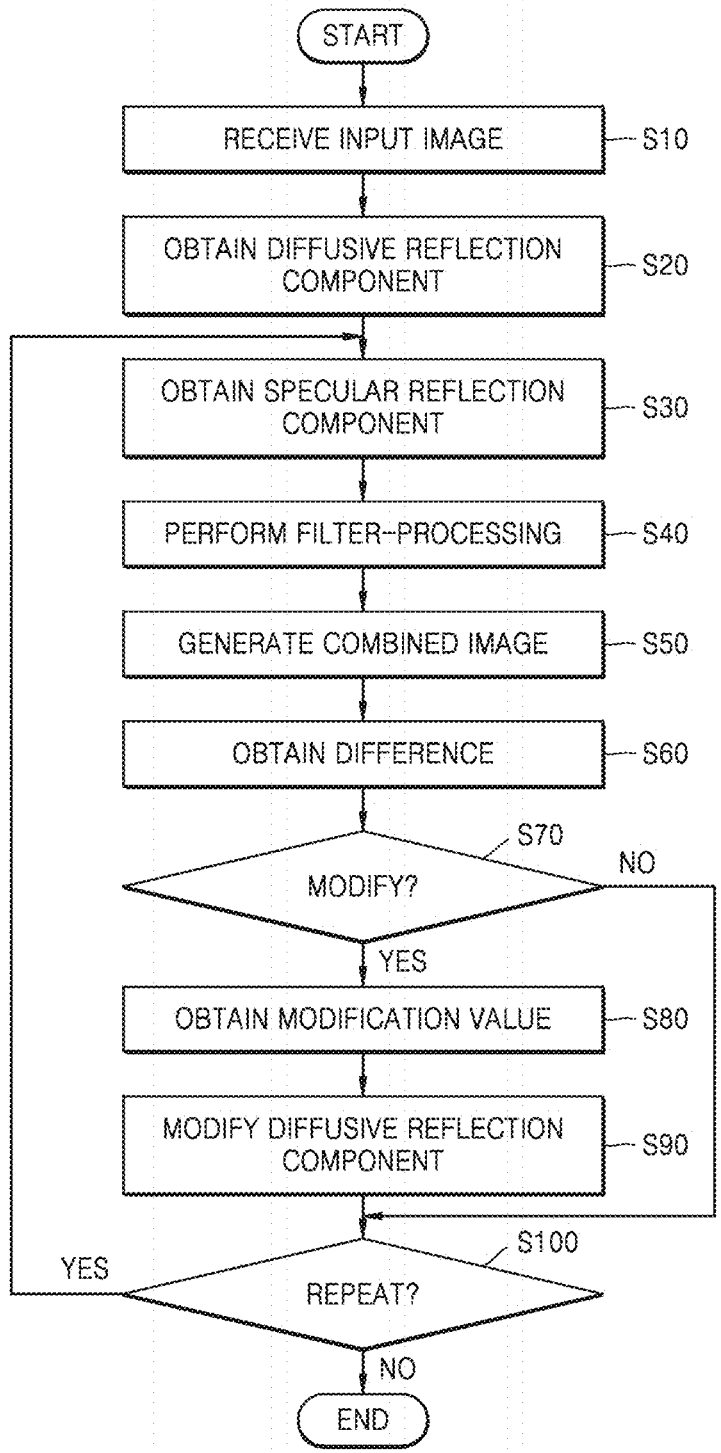
FIG. 3 is a flowchart showing a processing sequence of an image processing method according to an exemplary embodiment.

FIG. 3 is a flowchart showing a processing sequence of an image processing method according to an exemplary embodiment.

The image input unit 10 of the image processing apparatus 1 receives an image in operation S10, and the diffusive reflection component obtainer 20 obtains a diffusive reflection component of the input image for each pixel in operation S20. The diffusive reflection component obtainer 20 obtains each diffusive reflection component, for example, by using a known method.

Next, the specular reflection component obtainer 30 obtains the specular reflection component from the input image for each pixel by using a dichromatic reflection model of Shafer in operation S30.

More specifically, the specular reflection component obtainer 30 obtains a specular reflection component β×S by inputting a pixel value P of the input image and a diffusive reflection component α×D in the dichromatic reflection mode, as shown in Equation 1.

$$P = \alpha \times D + \beta \times S \quad \text{[Equation 1]}$$

where α indicates a diffusive reflection intensity coefficient, β indicates a specular reflection intensity coefficient, D indicates a diffusive reflection chromaticity, and S indicates a specular reflection chromaticity.

Figure 4:
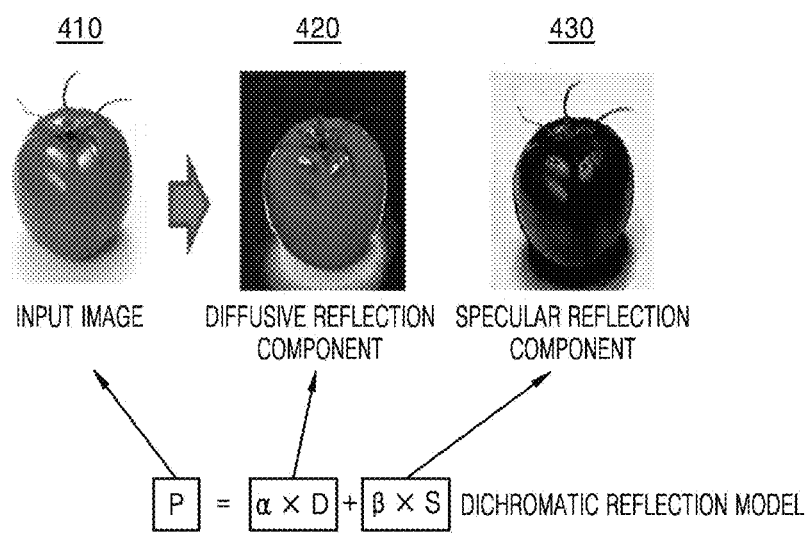
FIG. 4 illustrates a method and a result of obtaining a diffusive reflection component and a specular reflection component according to an exemplary embodiment.

FIG. 4 illustrates a method and a result of obtaining a diffusive reflection component and a specular reflection component according to an exemplary embodiment. A diffusive reflection component and a specular reflection component are obtained from an input image 410 of a tomato.

In a diffusive reflection component image 420 shown in FIG. 4, the tomato remains in red, but a background changes into black, and an edge portion (or boundary surface), a glossy portion, and a shadow portion of the tomato change into a peach color. In a specular reflection component image 430, the background and the glossy portion become gray, and the tomato, a stalk end and a shadow of the tomato change into black.

Next, the filter processor 40 performs filter-processing on the input image 410, the diffusive reflection component image 420, and the specular reflection component image 430 by using a high-pass emphasis filter, a high-pass filter, etc., in operation S40. By filter-processing such as a high-pass emphasis filter, etc., a diffusive reflection component and/or specular reflection component of a pixel having a low separation accuracy is emphasized.

Next, the component combiner 50 linearly combines the filter-processed diffusive reflection component image and the filter-processed specular reflection component image by using the dichromatic reflection model to generate a combined image in operation S50.

The difference obtainer 60 obtains, pixel by pixel, a pixel value difference between the filter-processed input image and the generated combined image in operation S60.

Figure 5:
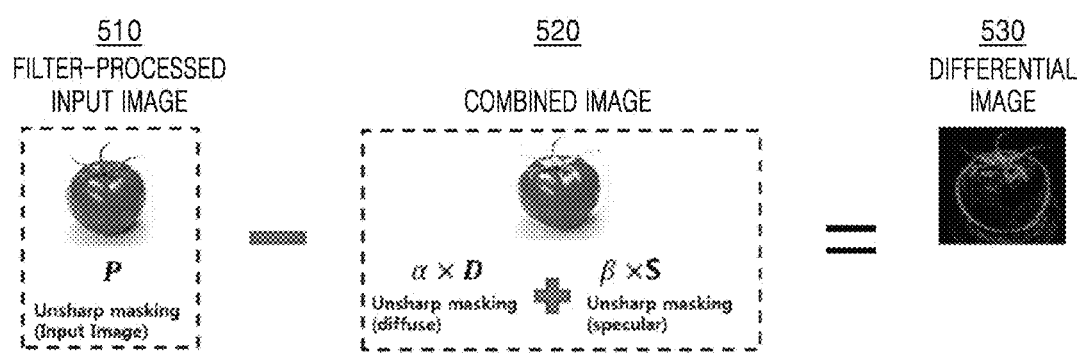
FIG. 5 illustrates difference processing and a differential image according to an exemplary embodiment.

FIG. 5 illustrates difference processing and a differential image according to an exemplary embodiment. Herein, unsharp masking or high-pass filtering is used for filter-processing, and a pixel value difference between a filter-processed input image 510 and a combined image 520 is obtained as a differential image 530. In the differential image 530 shown in FIG. 5, a pixel having a difference value greater than a predetermined threshold value is shown.

In the combined image 520, the boundary surface, the stalk end, and a portion of the shadow of the red tomato are white, and in the differential image 530, white portions are indicated as pixels having large differences. As stated above, the pixel having the pixel value difference greater than the threshold value is a pixel having low separation accuracy of the diffusive reflection component and the specular reflection component.

Next, the modification determiner 70 compares, pixel by pixel, a pixel value difference with the predetermined threshold value, determines a pixel having a pixel value difference greater than the threshold value as a pixel having low separation accuracy of the diffusive reflection component and the specular reflection component, and determines to modify the diffusive reflection component of the pixel in operation S70. The modification determiner 70 determines a pixel having a pixel value difference less than or equal to the threshold value as a pixel having high separation accuracy of the diffusive reflection component and the specular reflection component and determines not to modify the diffusive reflection component of the pixel in operation S70.

Such determination is based on an assumption that a combined image of reflection component images on which filter-processing is performed is identical or similar to an image obtained by performing the same filter-processing on an input image.

The modification determiner 70 determines to modify the diffusive reflection component of a pixel having a large pixel value difference in, for example, a differential image shown in FIG. 5 as a result of the comparison between the pixel value difference and the predetermined threshold value.

For the pixel (hereinafter, referred to as a "target pixel") whose the diffusive reflection component is determined to be modified by the modification determiner 70 (YES in operation S70), the modification value obtainer 80 obtains a diffusive reflection component of a neighboring pixel that satisfies a predetermined condition among neighboring pixels of the target pixel as a modification value of the diffusive reflection component of the target pixel in operation S80.

More specifically, the modification value obtainer 80 defines an energy function (also called a likelihood function or a cost function) as an objective function as shown in Equation 2, and obtains a diffusive reflection component of a neighboring pixel having the smallest value of the energy function as a modification value of the target pixel (A and B are weight coefficients).

Energy function=A×(a difference between a pixel value of a target pixel in an input image and a pixel value of a neighboring pixel in the input image)+B×(a difference between a pixel value of the neighboring pixel in the input image and a pixel value of the neighboring pixel in a combined image)  [Equation 2]

That is, the modification value obtainer 80 searches for a pixel having a color that is the same as or similar to a color of the target pixel and has high separation accuracy of a diffusive reflection component and a specular reflection component among neighboring pixels, and determines a diffusive reflection component of the searched neighboring pixel as a modification value of the target pixel.

The modification value obtainer 80 may search for a neighboring pixel by setting one of the weight coefficients A and B to 0.

The modification value obtainer 80 may also limit a range for searching for a neighboring pixel to a range obtained by the number of pixels whose specular reflection components are greater than the predetermined threshold value and which are determined as having specular reflection components. The threshold value may be an average value of specular reflection components in the entire image, a value that maximizes a Fischer ratio (or discrimination ratio) in Otsu's threshold determination, a value that minimizes a criterion for an average false-identification rate in Kittler's threshold determination, and so forth.

Next, the component modifier 90 replaces the diffusive reflection component of the target pixel with the modification value in operation S90.

The repetition determiner 100 determines whether to repeat modification of a diffusive reflection component according to whether a modification level of a diffusive reflection component of an image satisfies a predetermined condition, for example, whether the number of pixels having low separation accuracy of diffusive reflection components is less than or equal to a predetermined value or whether the number of modifications of the diffusive reflection components is greater than or equal to a predetermined value, in operation S100.

In response to a determination of the repetition determiner 100 to repeat modification (YES in operation S100) because the modification level of the diffusive reflection component of the image fails to satisfy the predetermined condition, the repetition determiner 100 goes back to operation S30 and obtains a specular reflection component again by using an output of diffusive reflection component modification (operation S90) that is provided as an input to the specular reflection component obtainer 30.

In response to a determination of the repetition determiner 100 not to repeat modification (NO in operation S100) because the modification level of the diffusive reflection component of the image satisfies the predetermined condition, the repetition determiner 100 outputs the diffusive reflection component obtained in operation S20 and the specular reflection component obtained in operation S30 for each pixel and/or the diffusive reflection component modified in operation S90 to the outside of the image processing apparatus 1 and terminates image processing.

In response to a determination of the modification determiner 70 not to modify a diffusive reflection component of a pixel (NO in operation S70), the repetition determiner 100 determines whether to repeat diffusive reflection component modification in operation S100.

In the image processing method according to an exemplary embodiment, as the number of repetitions of diffusive reflection component modification increases, separation accuracy of a diffusive reflection component and a specular reflection component may be improved.

Figure 6:
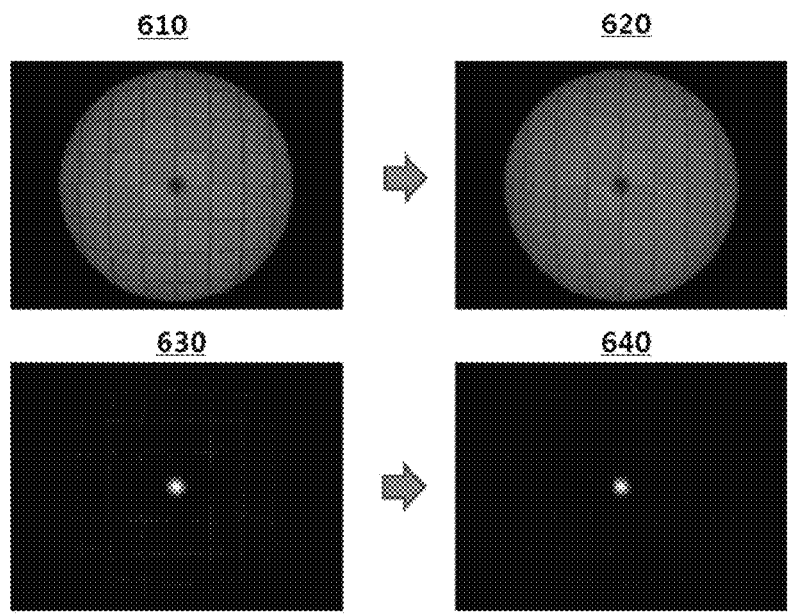
FIG. 6 is a diagram showing a separation accuracy improvement effect according to an exemplary embodiment.

FIG. 6 is a diagram showing a separation accuracy improvement effect according to an exemplary embodiment. In an input image, a computer graphic (CG) image of a sphere having a check pattern of red and green is used. In FIG. 6, an image 610 and an image 620 indicate images showing diffusive reflection components, and an image 630 and an image 640 indicate images showing specular reflection components. Also, the image 610 and the image 630 indicate the images before separation accuracy improvement according to an exemplary embodiment is applied and the image 620 and the image 640 indicate the images after separation accuracy improvement according to an exemplary embodiment is applied.

In the images 610, 620, 630, and 640, for a peak signal-to-noise ratio (PSNR) with respect to ground truth or a true value, an improvement of 4.5 dB in a diffusive reflection component and an improvement of 9.51 dB in a specular reflection component can be seen.

By independently performing image processing such as filter-processing on a diffusive reflection component and a specular reflection component obtained or modified as described above, the quality of an image, for example, texture and gloss, etc. of an image displayed on a display may be improved.

Figure 7:
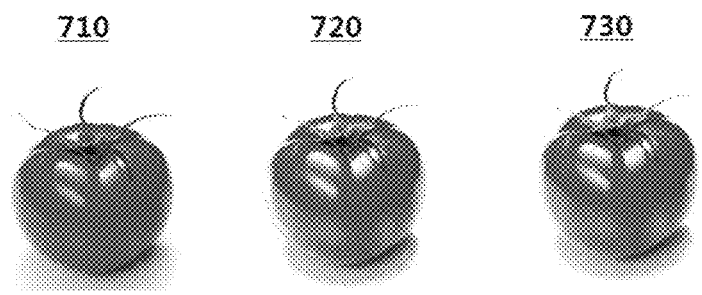
FIG. 7 is another diagram showing a separation accuracy improvement effect according to an exemplary embodiment.

FIG. 7 is another diagram showing a separation accuracy improvement effect according to an exemplary embodiment. In FIG. 7, an image 710, an image 720, and an image 730 indicate an input image, a specular reflection component-emphasized image before separation accuracy improvement according to an exemplary embodiment is applied, and a specular reflection component-emphasized image after separation accuracy improvement according to an exemplary embodiment is applied, respectively.

It can be seen that the specular reflection component-emphasized image 730 after the separation accuracy improvement has an improved gloss when compared to the input image 710, and artifacts around the boundary of a tomato are reduced in the specular reflection component-emphasized image 730 when compared to the specular reflection component-emphasized image 720 before the separation accuracy improvement.

Figure 8:
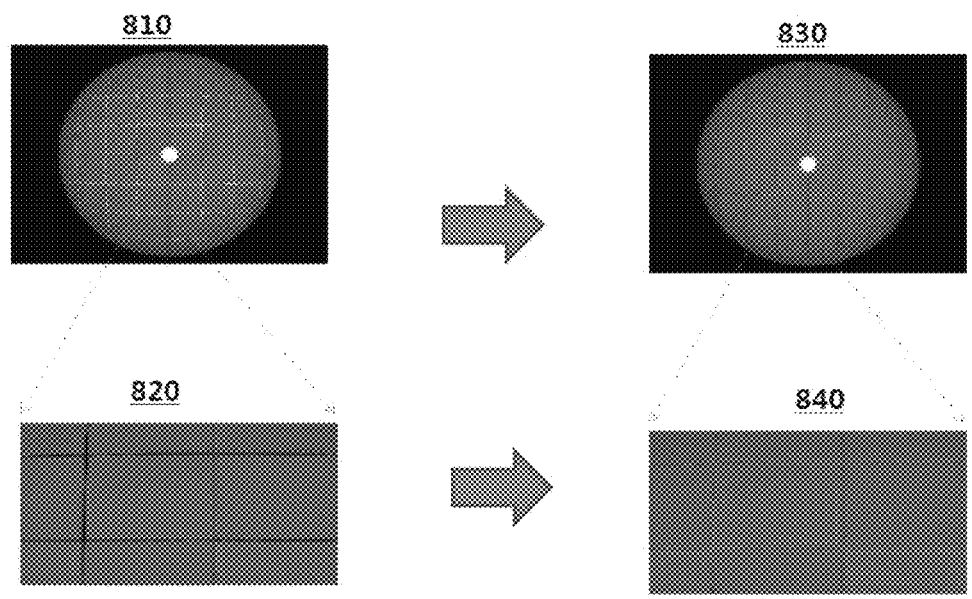
FIG. 8 is another diagram showing a separation accuracy improvement effect according to an exemplary embodiment.

FIG. 8 is another diagram showing a separation accuracy improvement effect according to an exemplary embodiment. In FIG. 8, an image 810 and an image 820 indicate specular reflection component-emphasized images before separation accuracy improvement, and an image 830 and an image 840 indicate specular reflection component-emphasized images after separation accuracy improvement. The image 820 and the image 840 indicate images in which portions of the images 810 and 830 are enlarged, respectively. For an input image of FIG. 8, a CG image as shown in FIG. 6 is used.

In the specular reflection component-emphasized images 810 and 820 before separation accuracy improvement, artifacts, e.g., black lines, appear in boundary portions between red and green of a check pattern, while in the specular reflection component-emphasized images 830 and 840 after separation accuracy improvement, the artifacts are reduced.

Figure 9:
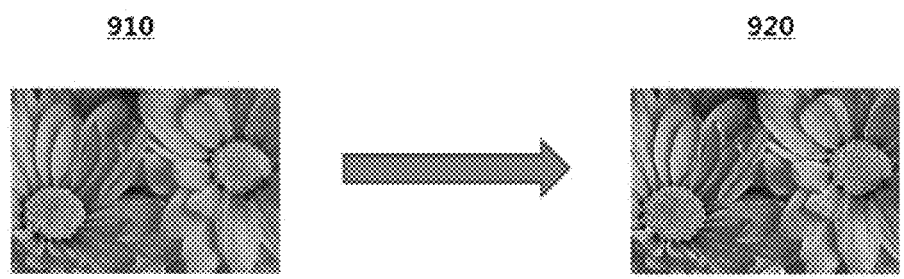
FIG. 9 is a diagram showing an image quality and texture improvement effect according to an exemplary embodiment.

FIG. 9 is a diagram showing an image quality and texture improvement effect according to an exemplary embodiment. In FIG. 9, an image 910 indicates an input image and an image 920 indicates an image in which image processing according to an exemplary embodiment is performed separately on a diffusive reflection component and a specular reflection component. In images 910 and 920, red-purple petals and yellow or yellow-green sepals in the center thereof are shown, and it can be seen that in the image 920 of FIG. 9 after image processing according to an exemplary embodiment is performed, a glossy feature is improved and thus the petals and sepals appear more clear.

In the image processing apparatus 1 or the image processing method according to an exemplary embodiment, various modifications may be made.

For example, in the image processing apparatus 1 according to an exemplary embodiment, it is described above that the modification value obtainer 80 obtains a modification value of a diffusive reflection component of a target pixel based on the energy function and the component modifier 90 modifies the diffusive reflection component of the target pixel. However, in another exemplary embodiment, the modification value obtainer 80 and the component modifier 90 may perform filter-processing such as a media filter on a region around the target pixel at the center thereof to modify the diffusive reflection component of the target pixel. In this case, for example, a median value obtained by a median filter may be a modification value of the diffusive reflection component.

Additionally, in the image processing apparatus 1 according to an exemplary embodiment, it is described above that the modification determiner 70 determines to modify a diffusive reflection component for each pixel and modifies the diffusive reflection component in subsequent processing. However, in an exemplary embodiment, the modification determiner 70 may determine to modify a specular reflection component for each pixel, the modification value obtainer 80 may obtain a modification value of the specular reflection component, and the component modifier 90 may replace a specular reflection component with a corresponding modification value for a pixel whose specular reflection component is determined to be modified. In this case, a diffusive reflection component (or new diffusive reflection component) may be obtained again using the modified specular reflection component.

Furthermore, in the image processing apparatus 1 according to an exemplary embodiment, it is described above that the modification determiner 70 evaluates a separation accuracy of a diffusive reflection component and/or a specular reflection component for each pixel based on a difference between a filter-processed input image and a combined image. However, in another exemplary embodiment, the modification determiner 70 may determine whether a pixel value of each pixel of a filter-processed diffusive reflection component image and/or a filter-processed specular reflection component image is negative to evaluate a separation accuracy of the diffusive reflection component and/or the specular reflection component of each pixel.

More specifically, the modification determiner 70 determines a pixel whose pixel value of the filter-processed diffusive reflection component image and/or the filter-processed specular reflection component image, e.g., any one of pixel values of R, G, and B in the filter-processed diffusive reflection component image and/or the filter-processed specular reflection component image that does not conform to a dichromatic reflection model, and thus determines to modify the diffusive reflection component and/or the specular reflection component of the determined pixel.

Also in this case, the modification value obtainer 80 obtains a modification value of the pixel from a difference between a pixel value of a filter-processed input image and a pixel value of a combined image by using the energy function expressed in Equation 2.

The modification determiner 70 may simultaneously perform first evaluation of a separation accuracy based on the difference between the filter-processed input image and the combined image and second evaluation of a separation accuracy based on a pixel value of each filter-processed reflection component image and determine to modify a diffusive reflection component and/or a specular reflection component of a pixel based on any one of the first and second evaluations, and the modification value obtainer 80 may obtain a modification value by using the energy function expressed in Equation 2.

In addition, the image processing apparatus 1 or the image processing method according to an exemplary embodiment may be configured as an image evaluating apparatus or an image evaluating method to evaluate a separation accuracy of a diffusive reflection component and/or a specular reflection component. For example, the image processing apparatus may be configured as the image evaluating apparatus by including a separation accuracy evaluator in the modification determiner 70, the modification value obtainer 80, the component modifier 90, and the repetition determiner 100. Detailed descriptions thereof will be provided later.

As described above, the image processing apparatus 1 according to an exemplary embodiment includes the diffusive reflection component obtainer 20 and the specular reflection component obtainer 30 (or collectively referred to as component obtainers) that obtain a diffusive reflection component and a specular reflection component for each pixel of an input image, respectively, the filter processor 40 that performs filter-processing on a diffusive reflection component image, a specular reflection component image, and the input image, the component combiner 50 that generates a combined image by combining the filter-processed diffusive reflection component image and the filter-processed specular reflection component image, and the difference obtainer 60 and the modification determiner 70 (or collectively referred to as evaluators) that evaluate a separation accuracy of a diffusive reflection component and/or a specular reflection component based on the combined image and the filter-processed input image.

Based on this structure, by properly evaluating the separation accuracy of the diffusive reflection component and/or the specular reflection component obtained from the single input image, the diffusive reflection component and/or the specular reflection component may be obtained with a high precision.

In the image processing apparatus 1 according to an exemplary embodiment, the evaluators 60 and 70 may obtain a difference between the combined image and the filter-processed input image for each pixel, compare the difference with the predetermined threshold value, and evaluate a separation accuracy of the diffusive reflection component and/or the specular reflection component.

According to an exemplary embodiment, a separation accuracy of a diffusive reflection component and/or a specular reflection component may be evaluated for each pixel.

The image processing apparatus 1 according to an exemplary embodiment further includes the modification value obtainer 80 that obtains a modification value of a diffusive reflection component and/or a specular reflection component for every pixel whose diffusive reflection component and/or specular reflection component is determined to be modified, and the component modifier 90 that modifies the diffusive reflection component and/or the specular reflection component by using the modification value, and the component obtainers 20 and 30 obtain the diffusive reflection component and the specular reflection component based on the input image, the modified specular reflection component, and/or the modified diffusive reflection component, and the evaluators 60 and 70 determine to modify a diffusive reflection component and/or a specular reflection component of a pixel having a difference greater than or equal to a predetermined threshold value.

According to an exemplary embodiment, a diffusive reflection component and/or a specular reflection component may be modified for each pixel.

In the image processing apparatus 1 according to an exemplary embodiment, the evaluator 70 may evaluate a separation accuracy of the diffusive reflection component and/or the specular reflection component according to whether a pixel value of a filter-processed diffusive reflection component image and/or a filter-processed specular reflection component image is negative.

According to an exemplary embodiment, a separation accuracy of a diffusive reflection component and/or a specular reflection component may be simply evaluated for each pixel.

The image processing apparatus 1 according to an exemplary embodiment further includes the modification value obtainer 80 that obtains a modification value of a diffusive reflection component and/or a specular reflection component for every pixel whose diffusive reflection component and/or specular reflection component is determined to be modified by the evaluator 70, and the component modifier 90 that modifies the diffusive reflection component and/or the specular reflection component by using the modification value, and the component obtainers 20 and 30 obtain the diffusive reflection component and the specular reflection component based on the input image, the modified specular reflection component, and/or the modified diffusive reflection component, and the evaluators 60 and 70 determine to modify a diffusive reflection component and/or a specular reflection component of a pixel corresponding to a negative pixel value of the filter-processed diffusive reflection component image and/or the filter-processed specular reflection component image.

According to an exemplary embodiment, a diffusive reflection component and/or a specular reflection component may be simply modified for each pixel.

In the image processing apparatus 1 according to an exemplary embodiment, the modification value obtainer 80 may obtain a diffusive reflection component and/or a specular reflection component of a neighboring pixel that satisfies a predetermined condition among neighboring pixels of the pixel determined to be modified as a modification value.

According to an exemplary embodiment, a modification value of a diffusive reflection component and/or a specular reflection component may be simply obtained.

In the image processing apparatus 1 according to an exemplary embodiment, the predetermined condition may be that a sum of a product of a predetermined coefficient and a difference between a pixel value of a target pixel in an input image and a pixel value of a neighboring pixel in the input image and a product of a predetermined coefficient and a difference between a pixel value of the neighboring pixel in the input image and a pixel value of the neighboring pixel in a combined image is smallest.

According to an exemplary embodiment, a modification value of a diffusive reflection component and/or a specular reflection component may be properly obtained.

In addition, the image processing apparatus 1 according to an exemplary embodiment may further include the repetition determiner 100 that repeats processing of the component obtainers 20 and 30 in response to determining that the number of pixels that need modification (e.g., having low separation accuracy) is greater than or equal to a predetermined value or in response to determining that the number of performing modification is less than or equal to a predetermined value.

According to an exemplary embodiment, a diffusive reflection component and/or a specular reflection component may be obtained with a high precision.

In the image processing apparatus 1 according to an exemplary embodiment, the filter processor 40 may use a high-pass emphasis filter in filter-processing.

According to an exemplary embodiment, a separation accuracy of a diffusive reflection component and/or a specular reflection component may be properly evaluated.

The image processing apparatus 1 according to an exemplary embodiment includes the component obtainers 20 and 30 that obtain a diffusive reflection component and a specular reflection component for each pixel of an input image, the filter processor 40 that performs filter-processing on a diffusive reflection component image and/or a specular reflection component image, and the evaluator 70 that evaluates a separation accuracy of a diffusive reflection component and/or a specular reflection component according to whether each pixel value of the filter-processed diffusive reflection component image and/or the filter-processed specular reflection component image is negative.

According to an exemplary embodiment, a separation accuracy of a diffusive reflection component and/or a specular reflection component may be simply evaluated.

The image processing method according to an exemplary embodiment includes operations S20 and S30 of obtaining a diffusive reflection component and a specular reflection component for each pixel of an input image, operation S40 of performing filter-processing on a diffusive reflection component image, a specular reflection component image, and the input image, operation S50 of generating a combined image by combining the filter-processed diffusive reflection component image and the filter-processed specular reflection component image, and operations S60 and S70 of evaluating a separation accuracy of a diffusive reflection component and/or a specular reflection component based on the combined image and the filter-processed input image.

According to an exemplary embodiment, by properly evaluating the separation accuracy of the diffusive reflection component and/or the specular reflection component obtained from the single input image, the diffusive reflection component and/or the specular reflection component may be obtained with a high accuracy.

An image processing program according to an exemplary embodiment is intended to execute a sequence of obtaining a diffusive reflection component and a specular reflection component for each pixel of an input image, a sequence of performing filter-processing on a diffusive reflection component image, a specular reflection component image, and the input image, a sequence of generating a combined image by combining the filter-processed diffusive reflection component image and the filter-processed specular reflection component image, and a sequence of evaluating a separation accuracy of a diffusive reflection component and/or a specular reflection component based on the combined image and the filter-processed input image.

According to an exemplary embodiment, by properly evaluating the separation accuracy of the diffusive reflection component and/or the specular reflection component obtained from the single input image, the diffusive reflection component and/or the specular reflection component may be obtained with a high precision.

The image processing apparatus 1 or the image processing method according to an exemplary embodiment evaluates a separation accuracy of a diffusive reflection component and/or a specular reflection component for each pixel based on a difference between a filter-processed input image and a combined image. However, the disclosure is not limited thereto. For example, an image evaluating apparatus or an image evaluating method according to another exemplary embodiment evaluates a separation accuracy of a diffusive reflection component and/or a specular reflection component for the entire image based on a PSNR between the filter-processed input image and the combined image.

Figure 10:
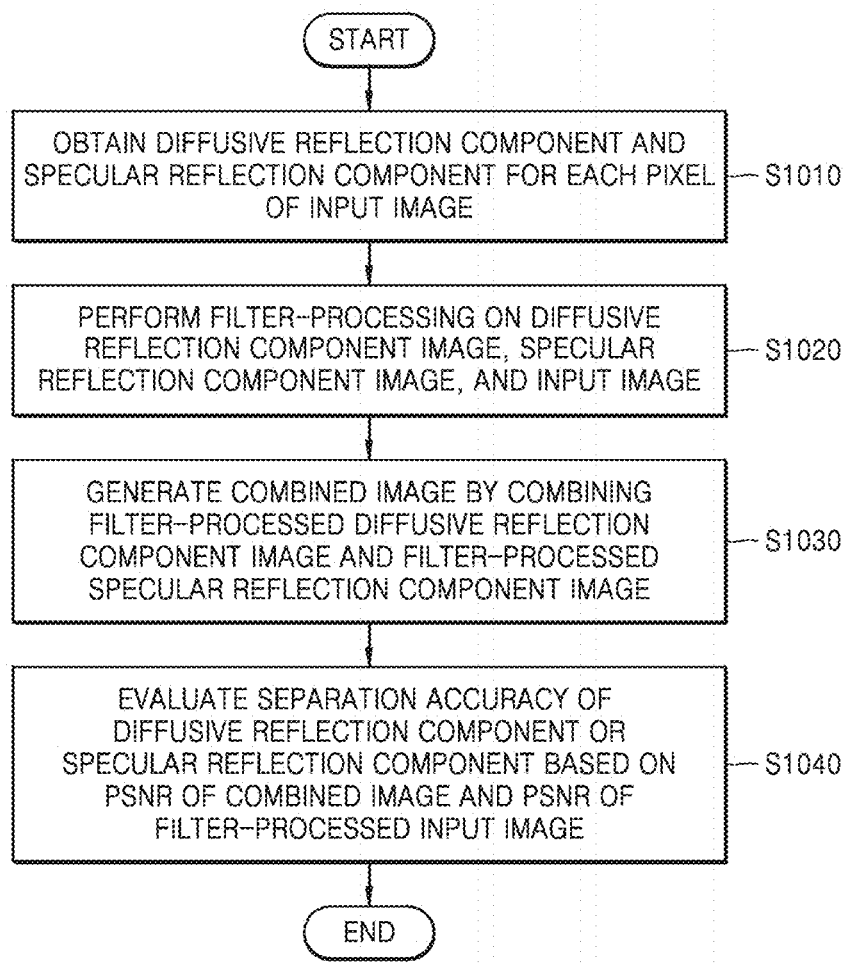
FIG. 10 is a flowchart showing operations of an image processing method according to another exemplary embodiment.

FIG. 10 is a flowchart showing operations of an image processing method according to another exemplary embodiment.

Referring to FIG. 10, in operation S1010, the image processing apparatus obtains a diffusive reflection component and a specular reflection component (or collectively referred to as reflection components) for each pixel of an input image.

In operation S1020, the image processing apparatus performs filter-processing on a diffusive reflection component image based on the obtained diffusive reflection component, a specular reflection component image based on the obtained specular reflection component, and the input image.

In operation S1030, the image processing apparatus combines the filter-processed diffusive reflection component image and the filter-processed specular reflection component image to generate a combined image.

In operation S1040, the image processing apparatus evaluates a separation accuracy of the diffusive reflection component and/or the specular reflection component based on a PSNR of the combined image and a PSNR of the filter-processed input image.

The image evaluating apparatus according to another exemplary embodiment may separate a reflection component by applying an existing method to the input image. Thereafter, a coefficient k of unsharp masking is set to a value (e.g., an initial value=1). Unsharp masking filtering is applied to the diffusive reflection component and the specular reflection component, respectively, by using the set coefficient k, and results of unsharp masking filtering are linearly combined based on a dichromatic reflection model. A PSNR between the combined result and an image obtained by applying unsharp masking to the input image by using the same coefficient k is obtained.

It is assumed that the PSNR being greater than a threshold value indicates that separation of the reflection components may be performed precisely. This is based on an assumption that an image obtained by applying unsharp masking to reflection components and combining the reflection components may be identical or similar to an image obtained by applying unsharp masking to the input image. In response to the PSNR being less than or equal to the threshold value, the coefficient k of unsharp masking is changed (k=k+1), and the above process is repeated. It is also assumed that the PSNR that does not exceed the threshold value up to a certain value of k indicates that separation of the reflection components is not performed accurately.

Figure 11:
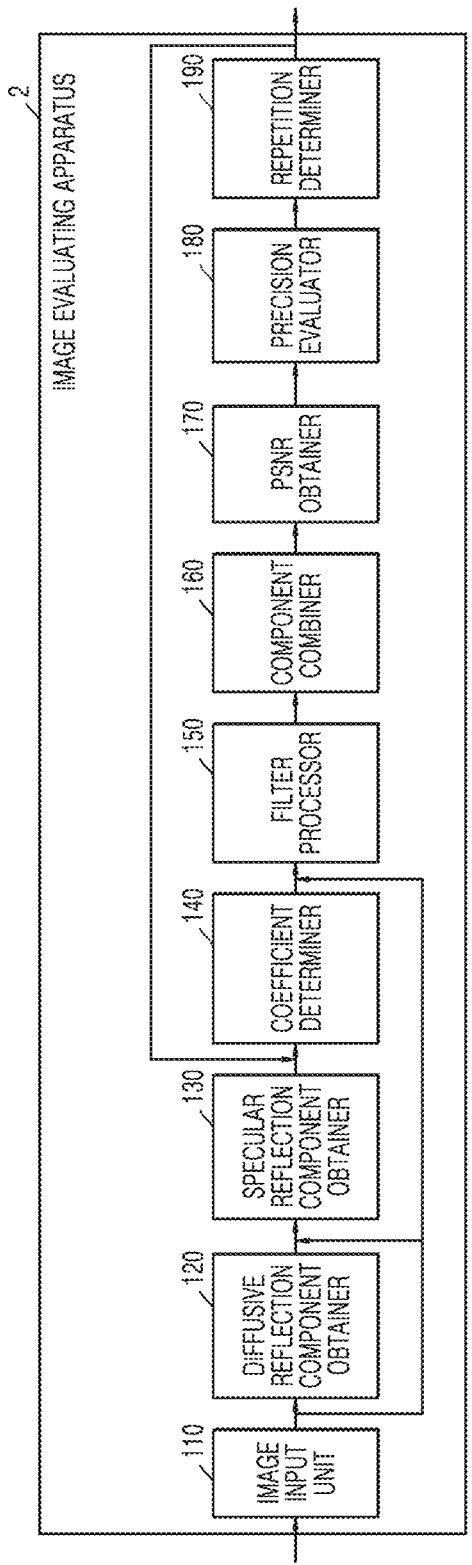
FIG. 11 is a block diagram of an image evaluating apparatus according to another exemplary embodiment.

FIG. 11 is a block diagram of an image evaluating apparatus 2 according to another exemplary embodiment.

The image processing apparatus 2 may include an image input unit 110, a diffusive reflection component obtainer 120, a specular reflection component obtainer 130, a coefficient determiner 140, a filter processor 150, a component combiner 160, a PSNR obtainer 170, a precision evaluator 180, and a repetition determiner 190.

In the image processing apparatus 2, the PSNR obtainer 170 and the precision evaluator 180 may be combined as an evaluator, and the coefficient determiner 140 may be included in the filter processor 150.

The image input unit 110 receives an image from the outside of the image evaluating apparatus 2, and outputs the input image to the diffusive reflection component obtainer 120, the specular reflection component obtainer 130, and the filter processor 150.

The diffusive reflection component obtainer 120 and the specular reflection component obtainer 130, similar to the diffusive reflection component obtainer 20 and the specular reflection component obtainer 30 according to the exemplary embodiment of FIG. 2, obtain a diffusive reflection component and a specular reflection component from a single input image and output the diffusive reflection component and the specular reflection component to the filter processor 150.

The coefficient determiner 140 determines the coefficient k of a filter used by the filter processor 150 as, for example, an initial value 1, and outputs the determined coefficient k to the filter processor 150 and the repetition determiner 190. The filter coefficient k will be described later.

The filter processor 150, similar to the exemplary embodiment of FIG. 2, performs sharpening on the input image, a diffusive reflection component image, and a specular reflection component image by using a high-pass emphasis filter or a high-pass filter, and outputs a result to the component combiner 160 and the PSNR obtainer 170.

FIG. 12 is a diagram for describing a filter according to another exemplary embodiment.

In another exemplary embodiment, in filter-processing, sharpening of emphasizing a contrast of each image by using unsharp mask processing is performed, and the filter coefficient k is multiplied to a differential image between an original image 1210 and a smoothing image 1220 to generate an unsharp mask image 1230.

The component combiner 160 generates a combined image by combining the filter-processed diffusive reflection component image and the filter-processed specular reflection component image by using the dichromatic reflection model, similar to the exemplary embodiment of FIG. 2, and outputs the combined image to the PSNR obtainer 170.

The PSNR obtainer 170 obtains a PSNR between the filter-processed input image and the generated combined image and outputs the obtained PSNR to the precision evaluator 180. The PSNR may be obtained by using a known technique, and further details thereof will be omitted.

The precision evaluator 180 compares the PSNR with a predetermined threshold value (e.g., 40 dB) and outputs a result of the comparison to the repetition determiner 190. The precision evaluator 180 determines that the diffusive reflection component and the specular reflection component are separated with high precisions when the PSNR is greater than or equal to the predetermined threshold value, and determines that the diffusive reflection component and the specular reflection component are not separated with high precisions when the PSNR is less than the predetermined threshold value.

For example, in response to the PSNR being greater than or equal to 40 dB, the reflection components may be determined as being separated with high precisions. This is because, when the PSNR is greater than or equal to 40 dB, an image difference is difficult to notice by naked eyes. That is, when a specular reflection component is emphasized to improve a glossy feature while separation of the reflection component is performed with high accuracy, the naked eyes may not notice any artifact on the image.

Figure 13:
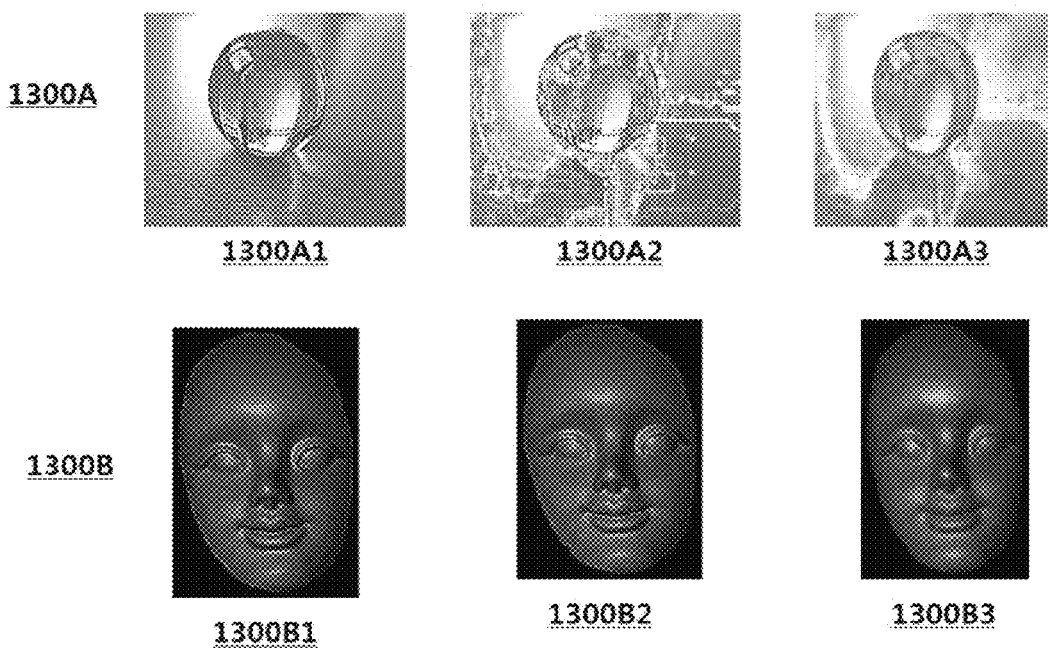
FIG. 13 is a diagram for describing a relationship between a peak signal-to-noise ratio (PSNR) value and artifacts.

FIG. 13 is a diagram for describing a relationship between a PSNR value and artifacts.

In FIG. 13, 1300A shows an example in which separation of reflection components fails due to a low PSNR. An image 1300A1 indicates an input image after filter-processing, an image 1300A2 indicates a combined image, and an image 1300A3 indicates an input in which a specular reflection component is emphasized 1.8 times.

The input image 1300A1 shows a bluish transparent sphere on a floor surface in which the background around the sphere is reflected on the sphere. In this example, separation accuracy of a diffusive reflection component and a specular reflection component are low, and a PSNR is 15.37 dB. The input image 1300A1 after filter-processing and the combined image 1300A2 become quite different from each other, and the image 1300A3 whose specular reflection component is emphasized includes many artifacts.

In FIG. 13, 1300B shows an example in which separation of reflection components is improved due to a high PSNR. An image 1300B1 indicates an input image after filter-processing, an image 1300B2 indicates a combined image, and an image 1300B3 indicates an input in which a specular reflection component is emphasized 1.8 times.

The input image 1300B1 is an image of a brown face with a black background. In this example, separation accuracy of a diffusive reflection component and a specular reflection component are high, and a PSNR is 41.08 dB. A difference between the input image 1300B1 after filter-processing and the combined image 1300B2 is small, and the image 1300B3 whose specular reflection component is emphasized has an emphasized gloss around a forehead and cheeks without no artifacts and/or noticeable artifacts.

As shown in FIG. 13, in an image having a PSNR of 40 dB or higher, no artifacts occur even when the specular reflection component is emphasized 1.8 times.

The repetition determiner 190 outputs a diffusive reflection component and a specular reflection component to the outside of the image evaluating apparatus 2 in response to a PSNR being greater than or equal to a predetermined threshold value. The repetition determiner 190 changes the filter coefficient k in response to the PSNR being less than a predetermined threshold, and outputs an instruction for changing the filter coefficient k to the coefficient determiner 140 to again perform processing by the coefficient determiner 140 to the precision evaluator 180, which includes obtaining the PSNR and performing separation accuracy evaluation.

The coefficient determiner 140 increases the filter coefficient k from the initial value "1" to, for example, "2" to change filter strength (or the strength of sharpening), and outputs the increased filter coefficient k to the filter processor 150. Processing by the filter processor 150 to the repetition determiner 190 is as described above.

The repetition determiner 190 repeats to obtain the PSNR and perform separation accuracy evaluation until the filter coefficient k reaches a predetermined value, e.g., 20, and in response to the PSNR being not greater than a predetermined threshold, the repetition determiner 190 determines that a diffusive reflection component and a specular reflection component are not separated with high precisions, and outputs the determination to the outside of the image evaluating apparatus 2.

The repetition determiner 190 may determine to obtain a diffusive reflection component and a specular reflection component again in response to the PSNR being not greater than or equal to the predetermined threshold, and output an instruction based on the determination to the diffusive reflection component obtainer 120 and the specular reflection component obtainer 130.

In another exemplary embodiment, the coefficient determiner 140 may determine the initial value of the filter coefficient k based on a luminance of the input image. For example, the coefficient determiner 140 may set the filter coefficient k to 0 for an average luminance of 0 of the input image and to 10 for an average luminance of an average luminance of 255.

The image evaluating apparatus 2 or the image evaluating method according to another exemplary embodiment may be configured as an image processing apparatus or an image processing method.

The image evaluating apparatus 2 according to another exemplary embodiment, similar to the exemplary embodiment of FIG. 2, may replace a diffusive reflection component and/or a specular reflection component of a pixel having a poor separation accuracy with a diffusive reflection component or a specular reflection component of a pixel having an improved separation accuracy, by using an energy function.

The image evaluating apparatus 2 according to another exemplary embodiment may be configured as an image processing apparatus and may be used in combination with the image processing apparatus 1. That is, a separation accuracy of a diffusive reflection component and/or a specular reflection component may be evaluated pixel by pixel by the image processing apparatus 1 according to an exemplary embodiment of FIG. 2 and may be evaluated for the entire image by an image processing apparatus according to another exemplary embodiment, thereby evaluating the separation accuracy properly.

As described above, in the image processing apparatus 2 according to another exemplary embodiment, the evaluators 170 and 180 may obtain a PSNR between the combined image and the filter-processed input image and compare the PSNR with the predetermined threshold value, thereby evaluating separation accuracy of diffusive reflection components and/or specular reflection components.

According to an exemplary embodiment, separation accuracy of diffusive reflection components and/or specular reflection components may be evaluated for the entire image.

The image processing apparatus 2 according to another exemplary embodiment may further include the repetition determiner 190 that determines to obtain a PSNR again by changing a filter strength used by a filter processor in response to the PSNR being less than a predetermined threshold, and the evaluators 170 and 180 may evaluate that separation accuracy of the diffusive reflection components and/or the specular reflection components are poor when the PSNR is less than the predetermined threshold in spite of the filter strength that is greater than or equal to the predetermined value.

According to an exemplary embodiment, the separation accuracy of the diffusive reflection components and/or the specular reflection components may be properly evaluated for the entire image.

Although the image processing apparatus and the image evaluating apparatus according to the exemplary embodiments of FIGS. 1, 2, 10 and 11 evaluate a separation accuracy of a diffusive reflection component and/or a specular reflection component based on a filter-processed input image and a combined image. However, the disclosure is not limited thereto. For example, an image evaluating apparatus or an image evaluating method according to still another exemplary embodiment may evaluate the separation accuracy of the diffusive reflection component and/or the specular reflection component by performing frequency analysis on the input image and the diffusive reflection component image and/or the specular reflection component image.

Figure 14:
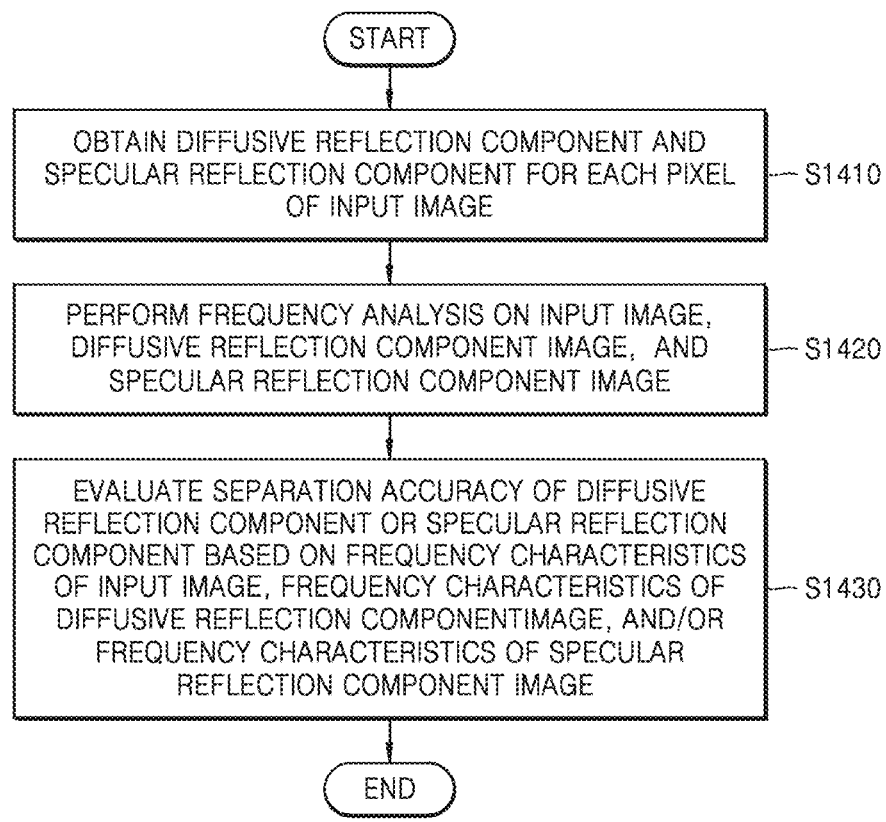
FIG. 14 is a flowchart showing operations of an image processing method according to still another exemplary embodiment.

FIG. 14 is a flowchart showing operations of an image processing method according to still another exemplary embodiment.

Referring to FIG. 14, in operation S1410, the image processing apparatus obtains a diffusive reflection component and a specular reflection component for each pixel of an input image.

In operation S1420, the image processing apparatus performs frequency analysis on the input image, a diffusive reflection component image based on the obtained diffusive reflection component, and a specular reflection component image based on the obtained specular reflection component to obtain frequency characteristics of each of them.

In operation S1430, the image processing apparatus evaluates a separation accuracy of the diffusive reflection component or the specular reflection component based on the frequency characteristics of the input image, the frequency characteristics of the diffusive reflection component image, and/or the frequency characteristics of the specular reflection component.

Figure 15:
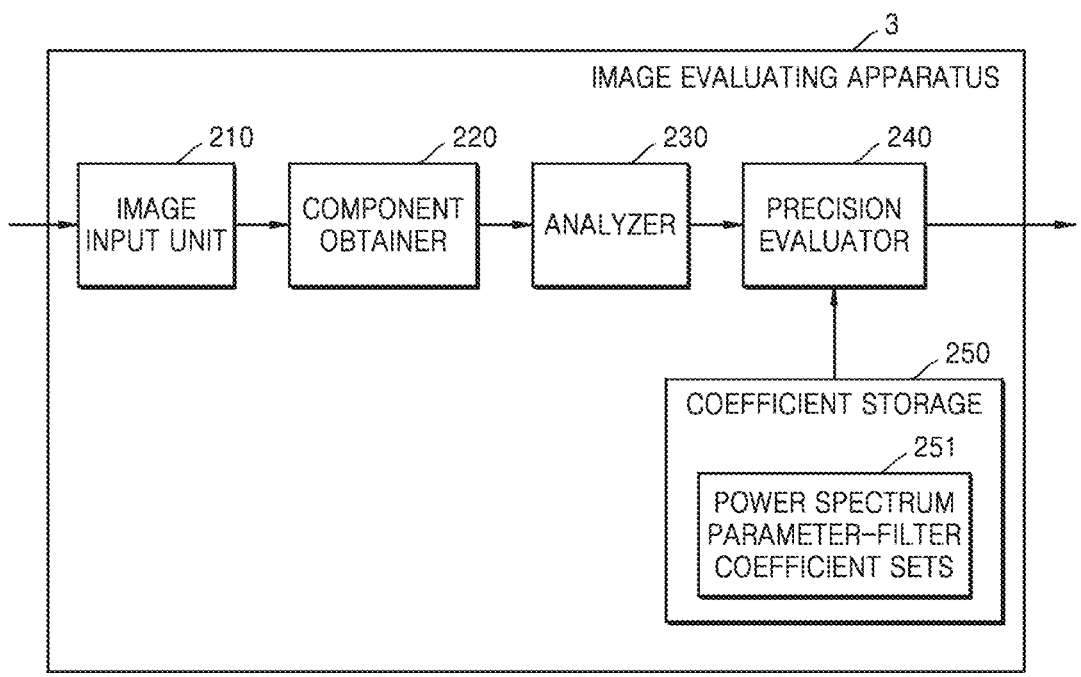
FIG. 15 is a block diagram of an image evaluating apparatus according to still another exemplary embodiment.

FIG. 15 is a block diagram of an image evaluating apparatus 3 according to still another exemplary embodiment.

The image evaluating apparatus 3 may include an image input unit 210, a component obtainer 220, an analyzer 230, and a precision evaluator 240.

The image input unit 210 receives an image from the outside of the image evaluating apparatus 3, and outputs the input image to the component obtainer 220.

The component obtainer 220 obtains a diffusive reflection component and/or a specular reflection component from a single input image and outputs the obtained diffusive reflection component and/or specular reflection component to the analyzer 230. The diffusive reflection component or the specular reflection component may be obtained in the same or similar manner as the exemplary embodiments of FIGS. 1 and 10.

The analyzer 230 performs two-dimensional (2D) fast Fourier transform (FFT) on the input image, and the diffusive reflection component image and/or the specular reflection component image, spectrumizes the FFT result, and outputs the spectrumizing result to the precision evaluator 240.

Figure 17:
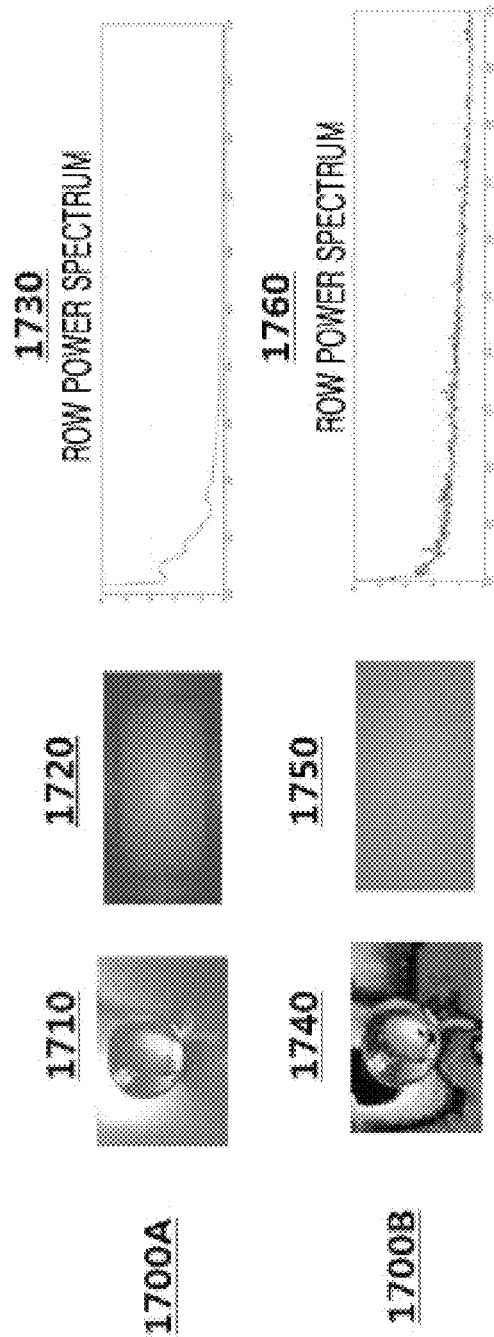
FIG. 17 is a diagram for describing a power spectrum according to still another exemplary embodiment.

FIG. 17 is a diagram for describing a power spectrum according to still another exemplary embodiment.

In 1700A of FIG. 17, an image 1710 indicates an input image, an image 1720 indicates an FFT image of the input image, and a graph 1730 indicates a power spectrum of the input image 1720, and in 1700B, an image 1740 indicates a diffusive reflection component image, an image 1750 indicates an FFT image of the diffusive reflection component image, and a graph 1760 indicates a power spectrum of the diffusive reflection component image 1740. A horizontal axis of the power spectrum indicates a frequency and a vertical axis of the power spectrum indicates a power.

The power spectrum 1760 of the diffusive reflection component image 1740 has more peaks and has higher powers in most frequencies than the power spectrum 1730 of the input image 1710, and thus it can be seen that the diffusive reflection component image has more high-frequency components than the input image. This means that the separation accuracy of the diffusive reflection component is not desirable.

The accuracy evaluator 240 compares a power spectrum based on the input image with a power spectrum based on the diffusive reflection component image and/or the specular reflection component image to evaluate the separation accuracy of the diffusive reflection component and/or the specular reflection component, and outputs the evaluation result to the outside of the image evaluating apparatus 3. In this case, the precision evaluator 240 evaluates the separation accuracy based on the number of peaks (or a peak number) of a power spectrum (or a shape of the power spectrum), a power of the power spectrum, and so forth.

The image evaluating apparatus 3 or the image evaluating method according to still another exemplary embodiment may be configured as an image processing apparatus or an image processing method.

The image evaluating apparatus 3 according to still another exemplary embodiment, similar to the exemplary embodiment of FIG. 2, may obtain a diffusive reflection component and a specular reflection component and replace a diffusive reflection component and/or a specular reflection component of a pixel having a poor separation accuracy with a diffusive reflection component and/or a specular reflection component of a pixel having an improved separation accuracy by using an energy function.

The image evaluating apparatus 3 according to still another exemplary embodiment may be configured as an image processing apparatus and may be used in combination with at least one of the image processing apparatus 1 according to the exemplary embodiment of FIG. 2 and the image processing apparatus according to the exemplary embodiment of FIG. 11. That is, a separation accuracy of a diffusive reflection component or a specular reflection component may be evaluated pixel by pixel by the image processing apparatus 1 according to the exemplary embodiment of FIG. 2 and may be evaluated for the entire image by the image processing apparatuses according to the exemplary embodiments of FIGS. 11 and 15, thereby evaluating the separation accuracy properly.

Figure 16:
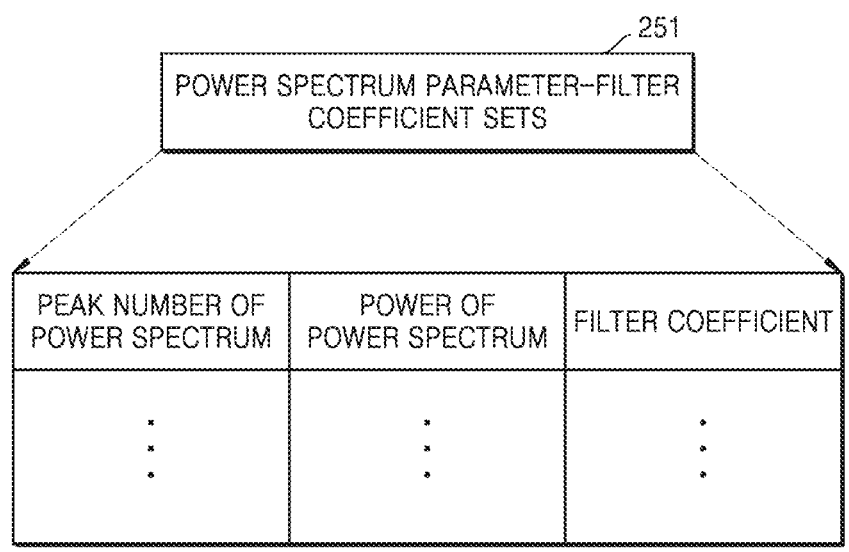
FIG. 16 shows power spectrum parameter-filter coefficient sets stored in a coefficient storage unit according to an exemplary embodiment.

FIG. 16 shows power spectrum parameter-filter coefficient sets stored in a coefficient storage unit according to an exemplary embodiment.

The combined image processing apparatus may map a power spectrum parameter such as a peak number or a power of a power spectrum based on a diffusive reflection component image or a specular reflection component image to the filter coefficient k (or a filter strength) suitable for filter-processing the corresponding component image, and store a plurality of power spectrum parameter-filter coefficient sets 251 in a coefficient storage 250. The coefficient storage 250 may be a part of, for example, the coefficient determiner 140. Referring to FIG. 16, the power spectrum parameter-filter coefficient set 251 includes a peak number of a power spectrum, a power of the power spectrum, and a filter coefficient. The power spectrum parameter-filter coefficient set 251 may be, for example, experimentally obtained.

When a new image is input, the analyzer may obtain a power spectrum based on a diffusive reflection component image or a specular reflection component image of the input image, and the coefficient determiner 140 may search, in the power spectrum parameter-filter coefficient sets 251, for a peak number and a power that are similar with a peak number and a power of the obtained power spectrum, and determine the filter coefficient k that is suitable for the diffusive reflection component image and/or the specular reflection component image.

Figure 18:
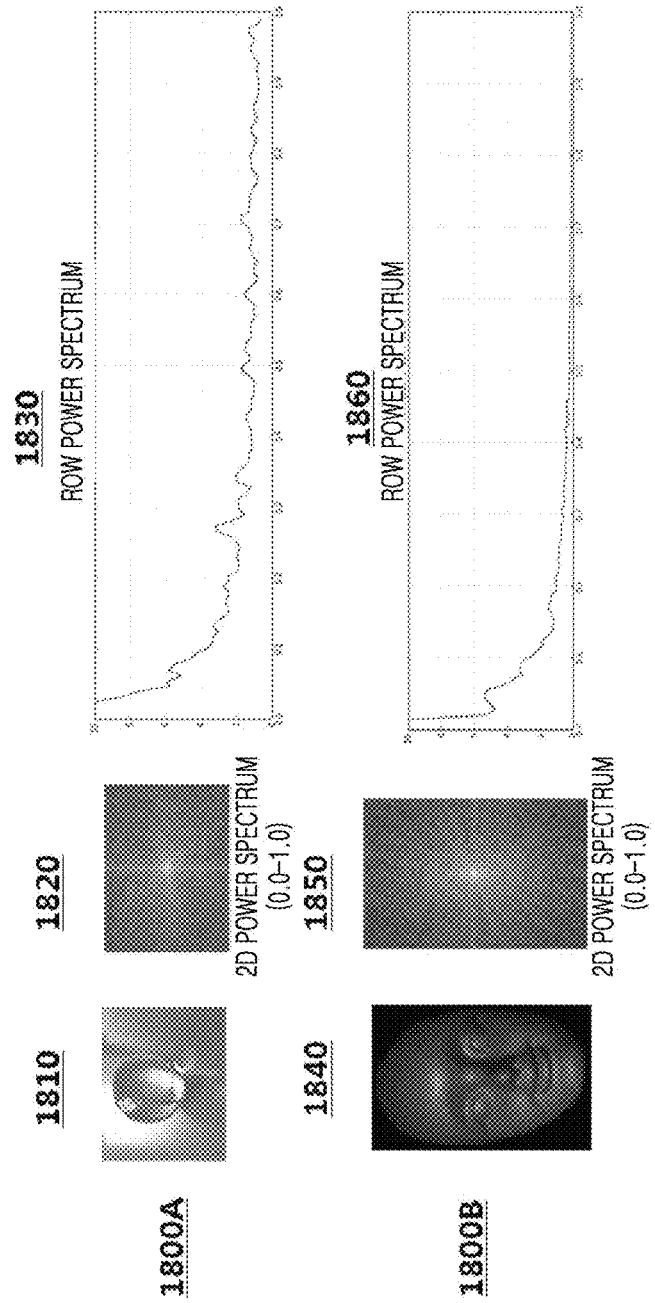
FIG. 18 is another diagram for describing a power spectrum according to still another exemplary embodiment.

FIG. 18 is another diagram for describing a power spectrum according to still another exemplary embodiment.

In 1800A of FIG. 18, an image 1810 indicates a first input image, an image 1820 indicates an FFT image of the first input image, and a graph 1830 indicates a power spectrum of the first input image. In 1800B of FIG. 18, an image 1840 indicates a second input image, an image 1850 indicates an FFT image of the second input image, and a graph 1860 indicates a power spectrum of the second input image.

In FIG. 18, since the power spectrum 1830 of the first input image has more peaks, higher powers, and more frequency components than the spectrum 1860 of the second input image, the coefficient determiner 140 determines a relatively low filter coefficient k in order not to much emphasize high-frequency components for the first input image and determines a relatively high filter coefficient k to emphasize high-frequency components for the second input image, based on the power spectrum parameter-filter coefficient sets 251.

As described above, the image processing apparatus 3 according to still another exemplary embodiment may include the analyzer 230 that performs frequency analysis on the input image, the diffusive reflection component image, and/or the specular reflection component image and obtains frequency characteristics of each image, and the second evaluator 240 that evaluates the separation accuracy of the diffusive reflection component and/or the specular reflection component based on the frequency characteristics of the input image, the frequency characteristics of the diffusive reflection component image and/or the frequency characteristics of the specular reflection component image.

According to an exemplary embodiment, separation accuracy of diffusive reflection components and/or specular reflection components may be simply evaluated for the entire image.

In the image processing apparatus 3 according to still another exemplary embodiment, the filter processors 140 and 150 may map in advance the frequency characteristics of the diffusive reflection component image and/or the frequency characteristics of the specular reflection component image to filter strengths used for filter-processing and store a plurality of frequency characteristics and filter strengths mapped to each other. The analyzer 230 may determine the filter strength used for filter-processing based on frequency characteristics of the obtained diffusive reflection component image and/or specular reflection component image.

According to an exemplary embodiment, a filter strength used for filter-processing of the diffusive reflection component image and/or the specular reflection component image may be easily determined.

The image processing apparatus 3 according to still another exemplary embodiment includes the component obtainers 220 that obtains a diffusive reflection component and a specular reflection component for each pixel of an input image, the analyzer 230 that performs frequency analysis on the input image, the diffusive reflection component image, and/or the specular reflection component image, and the evaluator 240 that evaluates a separation accuracy of the diffusive reflection component and/or the specular reflection component based on frequency characteristics of the input image and frequency characteristics of the diffusive reflection component image and/or the specular reflection component image.

According to an exemplary embodiment, a separation accuracy of a diffusive reflection component and/or a specular reflection component may be simply evaluated.

Figure 19:
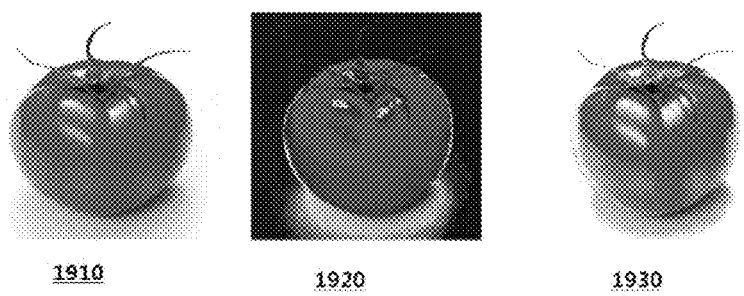
FIG. 19 shows an image for a low separation accuracy of a diffusive reflection component and a specular reflection component according to a comparative example.

FIG. 19 shows an image for a low separation accuracy of a diffusive reflection component and a specular reflection component according to a comparative example.

An image 1910 in FIG. 19 indicates an input image in which a red tomato is shaded with a light purple shadow in a white background. A red stalk end of the tomato is glossy.

An image 1920 in FIG. 19 indicates an image of a diffusive reflection component in which the red tomato has a black background, and an edge portion (or boundary surface), the glossy portion, and a shadow portion of the tomato have a peach color. Moreover, separation of the diffusive reflection component fails around the boundary surface of the tomato.

An image 1930 in FIG. 19 indicates an image in which the specular reflection component is obtained based on the diffusive reflection component and the specular reflection component is emphasized 1.8 times in the input image, When compared to the input image, the image 1930 has artifacts in the boundary portion, the glossy portion, and the shadow portion of the tomato. Thus, in the comparative example, the image 1930 on which the related art image processing method is performed has many artifacts noticeable to the naked eyes.

On the other hand, according to the exemplary embodiments, an image processing apparatus, an image processing method, and a computer-readable recording medium having recorded thereon a program for performing the image processing method are provided in which a diffusive reflection component and/or a specular reflection component is obtained from a single input image with a high precision.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While the disclosure has been shown and described with reference to certain example embodiments thereof, the scope of the disclosure is not limited to the description and also includes various modifications and improvements made by those of ordinary skill in the art using the concept of the present disclosure defined in the appended claims.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image processing apparatus comprising:
a memory to store one or more instructions; and
at least one processor configured to execute the one or more instruction to:
obtain diffusive reflection components and specular reflection components for pixels of an input image;
perform a first filter-processing on a diffusive reflection component image and a specular reflection component image, the diffusive reflection component image being based on the obtained diffusive reflection components and the specular reflection component image being based on the obtained specular reflection components, and perform a second filter-processing on the input image, the second filter-processing being the same as the first filter-processing;
combine the first filter-processed diffusive reflection component image and the first filter-processed specular reflection component image to generate a combined image; and
evaluate a separation accuracy of the diffusive reflection components and the specular reflection components based on the combined image and the second filter-processed input image; and
identify whether to modify at least one of a diffusive reflection component and a specular reflection component of at least one pixel based on a result of evaluation of the separation accuracy.

2. The image processing apparatus of claim 1, wherein the at least one processor is further configured to execute the one or more instruction to obtain pixel value differences between the combined image and the second filter-processed input image and to compare the pixel value differences with a predetermined threshold to evaluate the separation accuracy.

3. The image processing apparatus of claim 2, wherein the at least one processor is further configured to execute the one or more instruction to:
determine to modify a diffusive reflection component or a specular reflection component of a first pixel having a pixel value difference greater than the predetermined threshold;
obtain a modification value of the diffusive reflection component or the specular reflection component for the first pixel; and
modify the diffusive reflection component or the specular reflection component for the first pixel by using the modification value.

4. The image processing apparatus of claim 2, wherein the at least one processor is further configured to execute the one or more instruction to:
obtain a new diffusive reflection component or a new specular reflection component based on the input image, and the modified specular reflection component or the modified diffusive reflection component, and
identify whether to modify the new diffusive reflection component or the new specular reflection component based on the pixel value differences between the combined image, which is generated based on the modified specular reflection component or the modified diffusive reflection component, and the second filter-processed input image, which is generated based on the modified specular reflection component or the modified diffusive reflection component.

5. The image processing apparatus of claim 1, wherein the at least one processor is further configured to execute the one or more instruction to evaluate the separation accuracy according to whether a pixel of the first filter-processed diffusive reflection component image or the first filter-processed specular reflection component image has a negative pixel value.

6. The image processing apparatus of claim 5, wherein the at least one processor is further configured to execute the one or more instruction to determine to:
modify a diffusive reflection component or a specular reflection component of the pixel having the negative pixel value in the first filter-processed diffusive reflection component image or the first filter-processed specular reflection component image;
obtain a modification value of a diffusive reflection component or a specular reflection component for a second pixel; and
modify the diffusive reflection component or the specular reflection component for the second pixel by using the modification value.

7. The image processing apparatus of claim 3, wherein the at least one processor is further configured to execute the one or more instruction to obtain the modification value based on a diffusive reflection component or a specular reflection component of a neighboring pixel that satisfies a predetermined condition, among neighboring pixels around the first pixel.

8. The image processing apparatus of claim 7, wherein the predetermined condition is that a sum of a product of a predetermined first coefficient and a difference between a pixel value of the first pixel in the input image and a pixel value of the neighboring pixel in the input image and a product of a predetermined second coefficient and a difference between the pixel value of the neighboring pixel in the input image and a pixel value of the neighboring pixel in the combined image is smallest.

9. The image processing apparatus of claim 3, wherein the at least one processor is further configured to execute the one or more instruction to repeat obtaining of the diffusive reflection components and the specular reflection components, in response to determining at least one of a number of first pixels that need modification being greater than or equal to a predetermined first value and a number of performing modification being less than or equal to a predetermined second value.

10. The image processing apparatus of claim 1, wherein the at least one processor is further configured to execute the one or more instruction to obtain a peak signal-to-noise ratio (PSNR) between the combined image and the second filter-processed input image, and configured to compare the PSNR with a predetermined threshold to evaluate the separation accuracy.

11. The image processing apparatus of claim 10, wherein the at least one processor is further configured to execute the one or more instruction to;
in response to the PSNR being less than the predetermined threshold, change a filter strength used in the first filter-processing and the second filter-processing, and
evaluate the separation accuracy based on a new PSNR that is obtained based on the changed filter strength.

12. The image processing apparatus of claim 1, wherein the at least one processor is further configured to execute the one or more instruction to use a high-pass emphasis filter to perform the first filter-processing and the second filter-processing.

13. The image processing apparatus of claim 1, wherein the at least one processor is further configured to execute the one or more instruction to:
obtain frequency characteristics of the input image, and frequency characteristics of the diffusive reflection component image or the specular reflection component image; and
evaluate the separation accuracy based on the frequency characteristics of the input image, and the frequency characteristics of the diffusive reflection component image or the specular reflection component image.

14. The image processing apparatus of claim 13, wherein the at least one processor is further configured to execute the one or more instruction to:
map the frequency characteristics of the diffusive reflection component image or the specular reflection component image to a filter strength used in the first filter-processing and the second filter-processing and store a result of mapping; and identify the filter strength for the first filter-processing and the second filter-processing based on the frequency characteristics of the diffusive reflection component image or the specular reflection component image.

15. An image processing method comprising:

obtaining diffusive reflection components and specular reflection components for pixels of an input image;

performing first filter-processing on a diffusive reflection component image and a specular reflection component image, the diffusive reflection component image being based on the obtained diffusive reflection components and the specular reflection component image being based on the obtained specular reflection components, and performing second filter-processing on the input image, the second filter-processing being the same as the first filter-processing;

combining the first filter-processed diffusive reflection component image and the first filter-processed specular reflection component image to generate a combined image;

evaluating a separation accuracy of the diffusive reflection components and the specular reflection components based on the combined image and the second filter-processed input image; and identifying whether to modify at least one of a diffusive reflection component and a specular reflection component of at least one pixel based on a result of evaluation of the separation accuracy.

16. The image processing method of claim 15, wherein the evaluating comprises:

obtaining pixel value differences between the combined image and the second filter-processed input image and comparing the pixel value differences with a predetermined threshold to evaluate the separation accuracy.

17. The image processing method of claim 16, further comprising:

identifying whether to modify a diffusive reflection component or a specular reflection component of a first pixel having a pixel value difference greater than the predetermined threshold;

obtaining a modification value of the diffusive reflection component or the specular reflection component for the first pixel; and modifying the diffusive reflection component or the specular reflection component for the first pixel by using the modification value.

18. A non-transitory computer-readable recording medium having recorded thereon a program which is executable by at least one processor to perform an image processing method, the image processing method comprising:

obtaining diffusive reflection components and specular reflection components for pixels of an input image;

performing first filter-processing on a diffusive reflection component image and a specular reflection component image, the diffusive reflection component image being based on the obtained diffusive reflection components and the specular reflection component image being based on the obtained specular reflection components, and performing second filter-processing on the input image, the second filter-processing being the same as the first filter-processing;

combining the first filter-processed diffusive reflection component image and the first filter-processed specular reflection component image to generate a combined image;

evaluating a separation accuracy of the diffusive reflection components and the specular reflection components based on the combined image and the second filter-processed input image; and identifying whether to modify at least one of a diffusive reflection component and a specular reflection component of at least one pixel based on a result of evaluation of the separation accuracy.

19. The non-transitory computer-readable recording medium of claim 18, wherein the evaluating comprises:

obtaining pixel value differences between the combined image and the second filter-processed input image and comparing the pixel value differences with a predetermined threshold to evaluate the separation accuracy.

20. The non-transitory computer-readable recording medium of claim 19, wherein the image processing method further comprises:

identifying whether to modify a diffusive reflection component or a specular reflection component of a first pixel having a pixel value difference greater than or equal to the predetermined threshold;

obtaining a modification value of the diffusive reflection component or the specular reflection component for the first pixel; and modifying the diffusive reflection component or the specular reflection component for the first pixel by using the modification value.

* * * * *